United States Patent [19]

Sannohe et al.

[11] Patent Number: 5,453,859
[45] Date of Patent: Sep. 26, 1995

[54] POLARIZATION BEAM SPLITTER AND PROJECTION DISPLAY APPARATUS

[75] Inventors: Shinya Sannohe; Yoshito Miyatake, both of Osaka, Japan

[73] Assignee: Matsushita Electric Industrial Co., Ltd., Kadoma, Japan

[21] Appl. No.: 252,319

[22] Filed: Jun. 1, 1994

[30] Foreign Application Priority Data

Jun. 3, 1993 [JP] Japan .................. 5-133135

[51] Int. Cl.$^6$ .................. G02B 5/30; G02B 27/28; G03B 21/14; G02F 1/1335
[52] U.S. Cl. .................. 359/63; 353/20; 359/487; 359/498; 359/583; 359/588
[58] Field of Search .................. 359/352, 487, 359/488, 498, 583, 588, 63; 353/20

[56] References Cited

U.S. PATENT DOCUMENTS

| | | | |
|---|---|---|---|
| 2,403,731 | 7/1946 | MacNeille | 88/65 |
| 3,346,319 | 10/1967 | Billings | 350/150 |
| 3,622,225 | 11/1971 | Buchman et al. | 359/487 |
| 4,461,542 | 7/1984 | Gagnon . | |
| 4,544,237 | 10/1985 | Gagnon . | |
| 4,553,822 | 11/1985 | Mahlein | 350/377 |
| 4,733,926 | 3/1988 | Title | 359/488 |
| 4,966,438 | 10/1990 | Mouchart | 350/173 |
| 4,974,219 | 11/1990 | Korth | 369/13 |
| 5,357,370 | 10/1994 | Miyatake et al. | 359/495 |

FOREIGN PATENT DOCUMENTS

| | | | |
|---|---|---|---|
| 52-38942 | 3/1977 | Japan | 359/488 |
| 58-190906 | 11/1983 | Japan . | |
| 59-216110 | 12/1984 | Japan . | |
| 60-118803 | 6/1985 | Japan | 359/588 |
| 61-114205 | 5/1986 | Japan | 359/352 |
| 1126392 | 9/1968 | United Kingdom | 359/488 |
| 1405531 | 9/1975 | United Kingdom | 359/488 |

*Primary Examiner*—Martin Lerner
*Attorney, Agent, or Firm*—Renner, Otto, Boisselle & Sklar

[57] ABSTRACT

A polarization beam splitter which includes a first prism, a second prism, and a dielectric multilayer film which is sandwiched between the first and second prisms is disclosed. The dielectric multilayer film comprising: a plurality of high refractive index layers having a refractive index higher than refractive indices of the first and second prisms; a plurality of intermediate refractive index layers having a refractive index lower than the refractive index of the high refractive index layers; and a plurality of low refractive index layers having a refractive index lower than the refractive index of the intermediate refractive index layers, a reference incident angle $\theta_0$ of light which is incident on the dielectric multilayer film through the first or second prism being within a range of the following expression:

$$\theta_1 < \theta_0 < \theta_2$$

where $$\sin^2\theta_1 = \frac{n_L^2 n_H^2}{n_0^2(n_L^2 + n_H^2)}$$

and $$\sin^2\theta_2 = \frac{n_M^2 n_H^2}{n_0^2(n_M^2 + n_H^2)},$$

where $n_H$ indicates the refractive index of the high refractive index layers, $n_M$ indicates the refractive index of the intermediate refractive index layers, $n_L$ indicates the refractive index of the low refractive index layers, and $n_0$ indicates the refractive indices of the first and second prisms.

26 Claims, 17 Drawing Sheets

POLARIZATION BEAM SPLITTER AND PROJECTION DISPLAY APPARATUS

BACKGROUND OF THE INVENTION

1. Field of the Invention

The invention relates to a polarization beam splitter and a projection display apparatus in which the polarization beam splitter functions as a polarizer and an analyzer.

2. Description of the Related Art

As a technique of forming an image on a large screen, a method is well known in which an optical image corresponding to a video signal is formed on a light valve, the light valve is irradiated with light, and the optical image formed on the light valve is projected by a projection lens onto a screen while magnifying the image. Recently, a projection display apparatus in which a liquid crystal display is used as a light valve has attraction. For example, M. HIMURO proposes in Japanese Laid-Open Patent Publication No. 61-13885 a method in which the pixel number of a liquid crystal display can be increased or a high resolution can be attained without reducing the pixel aperture factor, by using a reflection-type liquid crystal display.

FIG. 16 shows an outline of a projection display apparatus using the reflection-type liquid crystal display. Light 2 which is emitted from a light source 1 so as to be substantially parallel is directed to a polarization beam splitter 3. The polarization beam splitter 3 reflects S-polarized light 4, and allows P-polarized light 5 to pass therethrough. The reflected S-polarized light 4 enters a liquid crystal display 6 in which each pixel is provided with a reflective electrode for reflecting light. When no voltage is applied to a liquid crystal layer of the liquid crystal display 6, the liquid crystal layer does not substantially show birefringence. In contrast, when a voltage is applied to the liquid crystal layer, the liquid crystal layer shows birefringence. Therefore, when linearly polarized light which is polarized in a predetermined direction enters the liquid crystal layer to which a voltage is applied, elliptically polarized light is reflected from the liquid crystal display. In other words, a portion of the S-polarized light 4 is converted into P-polarized light by the liquid crystal display 6. The reflected light including the S and P-polarized light enters again the polarization beam splitter 3. The P-polarized light included in the light reflected from the liquid crystal display 6 passes through the polarization beam splitter 3 to enter a projection lens 7, and the S-polarized light is reflected by the beam splitter to proceed toward the light source 1. In this way, an optical image produced in the form of a change of birefringence on the liquid crystal display 6 is magnified and projected by the projection lens 7 onto a screen (not shown).

In a reflection-type liquid crystal display, switching elements can be arranged under pixel electrodes. Accordingly, the pixel pitch can be shortened without reducing the size of the switching elements, and a high density can be attained without reducing the pixel aperture factor. Therefore, a reflection-type liquid crystal display can produce a projection image which is brighter and has a higher resolution than that produced by a transmission-type liquid crystal display.

In the configuration of the projection display apparatus shown in FIG. 16, when the S-polarized light 4 entering the liquid crystal display 6 is reflected therefrom without being converted into P-polarized light, and again reflected by the polarization beam splitter 3 toward the light source 1, a black display is conducted. At this time, if a portion of the S-polarized light fails to be reflected by the polarization beam splitter 3 and passes therethrough to enter the projection lens 7, the contrast of a resulting projection image is greatly impaired. In order to obtain a high-contrast projection image, therefore, the polarization beam splitter 3 must be designed so as to have a very small transmittance of S-polarized light.

In contrast, the light converted into P-polarized light by the liquid crystal display 6 passes through the polarization beam splitter 3, and is then projected on the screen so as to conduct a white display. In order to obtain a highly bright projection display, therefore, the polarization beam splitter 3 is required to have a high performance of transmitting P-polarized light.

Generally, as the polarization beam splitter 3, mainly used is a type which is proposed by S. M. MacNeille in U.S. Pat. No. 3,346,319 and in which two glass prisms are attached together to form a cube or a rectangular parallelepiped, and a multilayer optical thin film is formed at the interface of the two glass prisms. The multilayer optical thin film is structured by alternately stacking two kinds of thin layers having different refractive indices, and splits natural light into two polarized light components having polarizing planes which perpendicularly cross each other, by utilizing Brewster's angle and the interference effect of light. The material and film thickness of the multilayer film are selected so as to satisfy the Brewster's angle condition in which the transmittance of P-polarized light of a specific wavelength is 100%. When the Brewster's angle is indicated by $\theta_G$, the refractive index of the glass prism by $n_G$, the refractive index of low refractive index layers by $n_1$, and the refractive index of high refractive index layers by $n_2$, the Brewster's angle is expressed by the following expression:

$$\sin^2 \theta_G = \frac{n_1^2 n_2^2}{n_G^2 (n_1^2 + n_2^2)} \quad (1)$$

When the incident angle to the multilayer film face equals the Brewster's angle, the transmittance of S-polarized light can be reduced by increasing the number of layers of the multilayer film, while maintaining the transmittance of P-polarized light to be 100%.

However, the performance of a polarization beam splitter of this kind depends on the incident angle of light. When the incident angle is shifted from a reference incident angle, particularly, the transmittance of P-polarized light is greatly reduced.

Hereinafter, the reference incident angle of light indicates an angle designed so that the multi-layer film operates to effectively split the light incident on the film at the angle into two polarized light components. The incident angle of light indicates an angle at which main portion of the light is incident on the multilayer film. In other words, the incident angle is an angle between a beam axis of light and the plane of the multilayer film.

In the configuration of FIG. 16, light which is not perfectly parallel enters the polarization beam splitter 3 in most cases, and therefore the above-described incident angle dependence of the performance of the polarization beam splitter 3 causes the light efficiency to be extremely lowered.

As an example, spectral transmittance characteristics of a polarization beam splitter are shown in FIG. 17 which are obtained in the case where, in expression (1), the reference incident angle to the multilayer film face is 45°, the refractive index of the low refractive index layers is 1.46, the refractive index of the high refractive index layers is 2.30, and the refractive index of the prism is 1.74. The polarization beam splitter includes a multilayer film having an alternating structure consisting of 13 layers in which the first and thirteenth layers counted from the side of the coated face are low refractive index layers having an optical thickness of $\lambda_0/8$ ($\lambda_0=730$ nm, hereinafter $\lambda_0$ indicates the main wavelength of design), and the other layers have an optical thickness of $\lambda_0/4$. It will be seen that there is a wavelength at which, when the incident angle of light is changed by $\pm 5°$ from the reference incident angle, the transmittance of P-polarized light is reduced by 50% or more at the maximum.

In order to prevent this problem from arising, the range of the incident angle of light can be reduced by making small the effective aperture of the optical system. When the effective aperture of the optical system is made small, however, the light efficiency is lowered, and therefore it is difficult to provide a projection image which is sufficiently bright.

SUMMARY OF THE INVENTION

The polarization beam splitter of this invention includes a first prism, a second prism, and a dielectric multilayer film which is sandwiched between the first and second prisms, the dielectric multilayer film including: a plurality of high refractive index layers having a refractive index higher than refractive indices of the first and second prisms; a plurality of intermediate refractive index layers having a refractive index lower than the refractive index of the high refractive index layers; and a plurality of low refractive index layers having a refractive index lower than the refractive index of the intermediate refractive index layers, a reference incident angle $\theta_0$ of light which is incident on the dielectric multilayer film through the first or second prism being within a range of the following expression:

$$\theta_1 < \theta_0 < \theta_2 \quad (2)$$

where $$\sin^2 \theta_1 = \frac{n_L^2 n_H^2}{n_G^2 (n_L^2 + n_H^2)} \quad (3)$$

and $$\sin^2 \theta_2 = \frac{n_M^2 n_H^2}{n_G^2 (n_M^2 + n_H^2)}, \quad (4)$$

where $n_H$ indicates the refractive index of the high refractive index layers, $n_M$ indicates the refractive index of the intermediate refractive index layers, $n_L$ indicates the refractive index of the low refractive index layers, and $n_G$ indicates the refractive indices of the first and second prisms.

In one aspect of the invention, a projection display apparatus includes: a light source which radiates light including three primary color components; a pre-polarizer which selectively allows substantially linearly polarized light of light radiated from the light source, to pass through the pre-polarizer; color separation means for separating light output from the pre-polarization beam splitter into three primary color light beams; three polarization beam splitters which function as polarizers and analyzers, and which respectively correspond to the three primary color light beams; three reflection light values which respectively modulate polarization states of light beams entering from the three polarization beam splitters, thereby forming optical images; and three projection lenses which respectively project the optical images formed by the three light valves, onto a screen, each of the three polarization beam splitters including a first prism, a second prism, and a dielectric multilayer film which is sandwiched between the first and second prisms, the dielectric multilayer film including: a plurality of high refractive index layers having a refractive index higher than refractive indices of the first and second prisms; a plurality of intermediate refractive index layers having a refractive index lower than the refractive index of the high refractive index layers; and a plurality of low refractive index layers having a refractive index lower than the refractive index of the intermediate refractive index layers, a reference incident angle $\theta_0$ of light which is incident on the dielectric multilayer film through the first or second prism being within a range of the above expressions, and said polarization beam splitter changes a propagation direction of said linearly polarized light which has passed through said pre-polarizer, to direct said linearly polarized light to said light valve, selectively transmits light which has the polarization state modulated by said light valve, and which has been reflected by said light valve, and directs said selectively transmitted linearly polarized light to said projection lens.

Thus, the invention described herein makes possible the advantages of (1) providing a polarization beam splitter in which the incident angle dependence of the light transmittance for P-polarized light is suppressed, and (2) providing a projection display apparatus which can display a highly bright and high-contrast projection image.

These and other advantages of the present invention will become apparent to those skilled in the art upon reading and understanding the following detailed description with reference to the accompanying figures.

DESCRIPTION OF THE PREFERRED EMBODIMENTS

Example 1

An example of the invention will be described with reference to the accompanying drawings.

Figure 1:
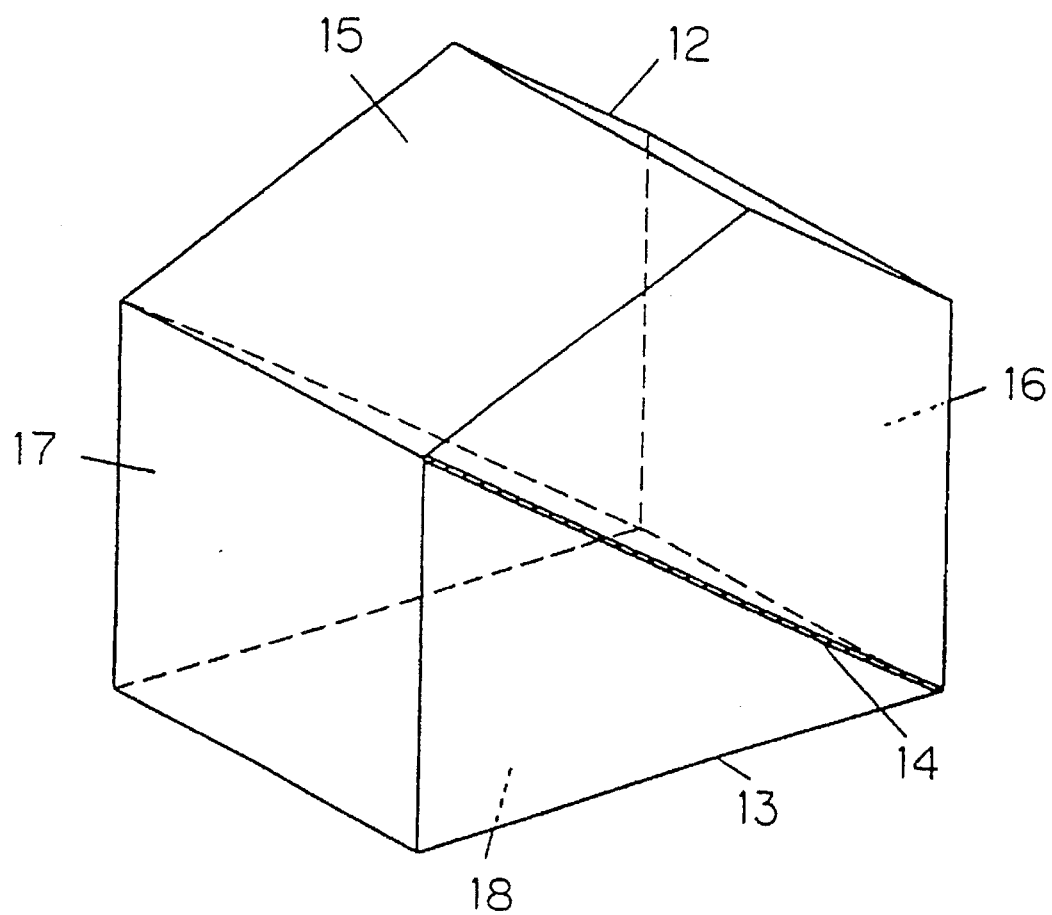
FIG. 1 is a perspective view of a polarization beam splitter of the invention.

FIG. 1 is a perspective view showing structure of an example of the polarization beam splitter of the invention. A glass prism 12 is a quadrangular prism having a trapezoid section shape which is obtained by partially cutting off an isosceles triangle, and a glass prism 13 which is a triangular prism. A multilayer film 14 is sandwiched between the glass prisms 12 and 13 (which are made of borosilicate crown glass of a refractive index $n_0$ of 1.52). Planes 15, 16, 17 and 18 are planes through which light enters or exits. The faces of the multilayer film 14 are positioned so as to form an angle of 57° to the planes 15, 16 and 17, and an angle of 33° to the plane 18, and to form a close contact with the glass prisms 12 and 13, so as to function as a polarization beam splitter 11. Light incident on the plane 15 is split by the multilayer film 14 into S-polarized light transmitting through the plane 16, and P-polarized light transmitting through the plane 18. The shapes of the glass prisms 12 and 13 are not limited to the above-mentioned ones. Each of the glass prisms 12 and 13 can be a prism of any shape having planes which are related to the multilayer film 14 as described above. In place of the glass prisms 12 and 13, prisms made of a sufficiently-low birefringent and transparent material other than glass may be used.

Figure 2:
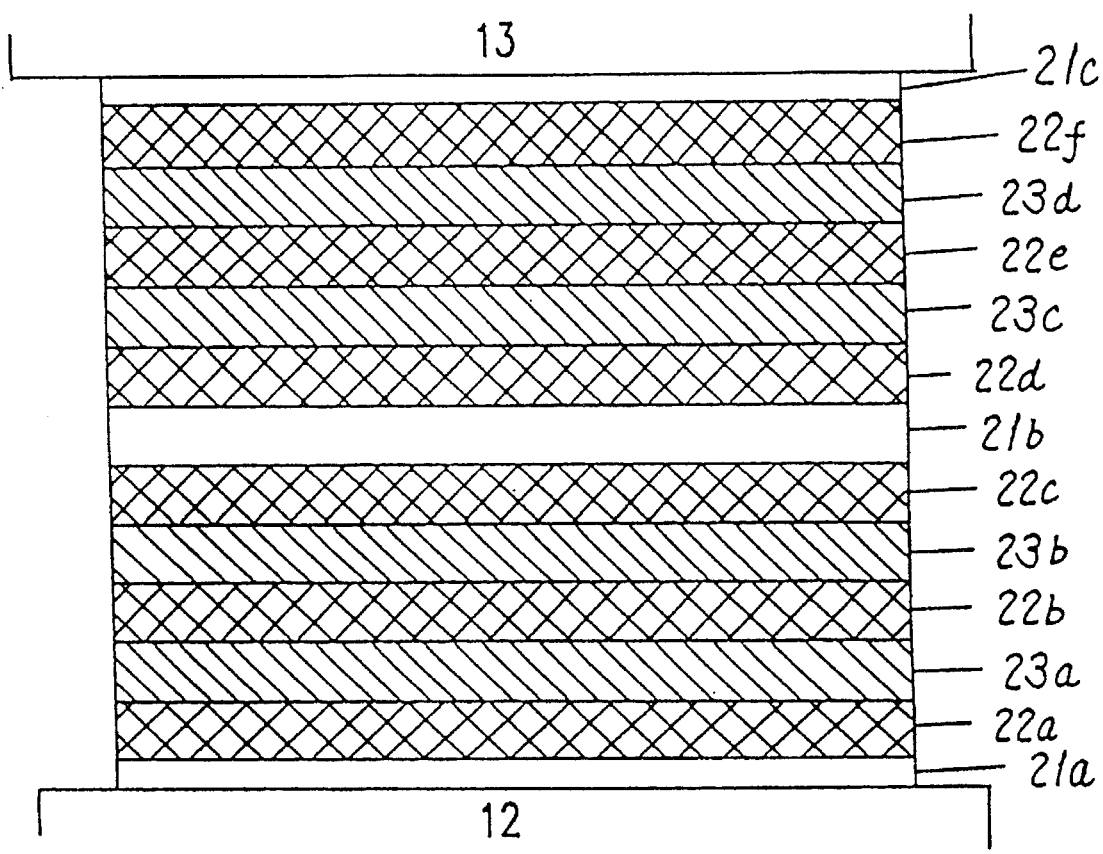
FIG. 2 is an enlarged view of the structure of a multilayer film of a polarization beam splitter of the invention.

An enlarged view of the structure of the multilayer film 14 is shown in FIG. 2, and an example of its design in Table 1 below. The multilayer film 14 has a structure consisting of 13 layers. Silicon dioxide layers (refractive index $n_L$=1.46) 21a, 21b and 21c are used as low refractive index layers, titanium dioxide layers (refractive index $n_H$=2.30) 22a to 22f are used as high refractive index layers, and dialuminum trioxide layers (refractive index $n_M$=1.62) 23a to 23d are used as intermediate refractive index layers. These layers are formed on the glass prism 12 by vacuum deposition and stacked to form a lamination of the following sequence which starts from the side of the glass prism 12: silicon dioxide 21a, titanium dioxide 22a, dialuminum trioxide 23a, titanium dioxide 22b, dialuminum trioxide 23b, titanium dioxide 22c, silicon dioxide 21b, titanium dioxide 22d, dialuminum trioxide 23c, titanium dioxide 22e, dialuminum trioxide 23d, titanium dioxide 22f, and silicon dioxide 21c. The optical thicknesses of the layers are set so that the silicon dioxide layers 21a and 21c have a thickness of $\lambda_0/8$ ($\lambda_0$=740 nm), and the other layers have a thickness of $\lambda_0/4$. The multilayer film 14 may be deposited on the glass prism 13 achieving the same effects.

TABLE 1

| Material | Refractive Index n | Optical thickness nd (nm) | Physical thickness d (nm) |
|---|---|---|---|
| Glass | 1.52 | — | — |
| $SiO_2$ | 1.46 | $\lambda_\theta/8$:92.5 | 63.4 |
| $TiO_2$ | 2.30 | $\lambda_\theta/4$:185.0 | 80.4 |
| $Al_2O_3$ | 1.62 | $\lambda_\theta/4$:185.0 | 114.2 |
| $TiO_2$ | 2.30 | $\lambda_\theta/4$:185.0 | 80.4 |
| $Al_2O_3$ | 1.62 | $\lambda_\theta/4$:185.0 | 114.2 |
| $TiO_2$ | 2.30 | $\lambda_\theta/4$:185.0 | 80.4 |
| $SiO_2$ | 1.46 | $\lambda_\theta/4$:185.0 | 126.7 |
| $TiO_2$ | 2.30 | $\lambda_\theta/4$:185.0 | 80.4 |
| $Al_2O_3$ | 1.62 | $\lambda_\theta/4$:185.0 | 114.2 |
| $TiO_2$ | 2.30 | $\lambda_\theta/4$:185.0 | 80.4 |
| $Al_2O_3$ | 1.62 | $\lambda_\theta/4$:185.0 | 114.2 |
| $TiO_2$ | 2.30 | $\lambda_\theta/4$:185.0 | 80.4 |
| $SiO_2$ | 1.46 | $\lambda_\theta/8$:92.5 | 63.4 |
| Glass | 1.52 | — | — |

Main wavelength of design $\lambda_\theta$ = 740 nm, reference incident angle: 57°

Figure 17:
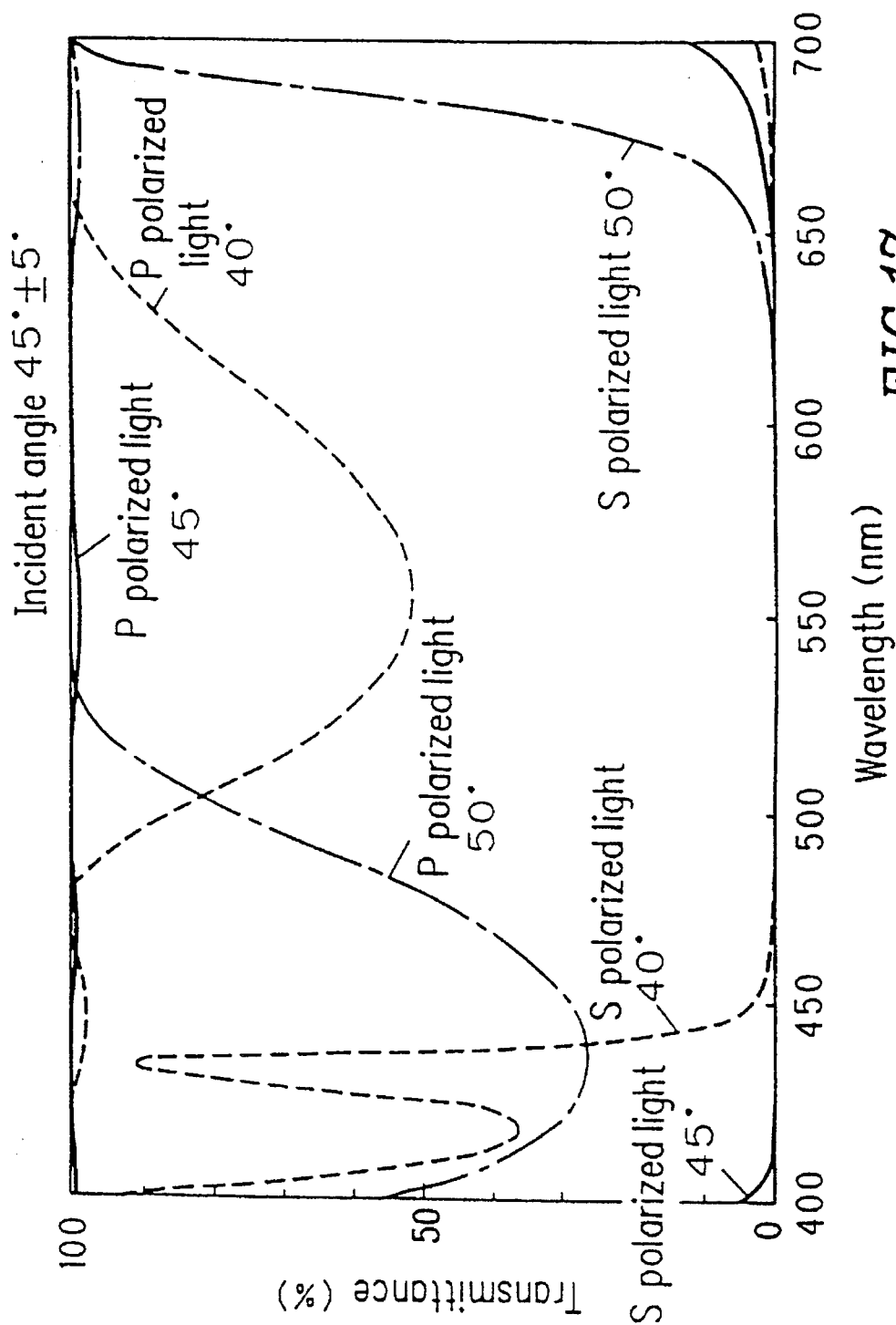
FIG. 17 is a graph illustrating spectral transmittance characteristics of a polarization beam splitter of the prior art.

The multilayer film 14 is structured in such a manner that the even-numbered layers counted from the side of the glass prism 12 are made of titanium dioxide constituting high refractive index layers, and that alternating layers of silicon dioxide of a refractive index of 1.46 and titanium dioxide of a refractive index of 2.30, and alternating layers of dialuminum trioxide of a refractive index of 1.62 and titanium dioxide of a refractive index of 2.30 are combined. When, referring to two Brewster's angles of 54.2° and 60.6° obtained from expressions (3) and (4), the reference incident angle of light is set to be 57° which exists between 54.2° and 60.6° as indicated by expression (2), the transmittance of P-polarized light changing depending on the incident angle is averaged. Therefore, a sudden reduction of the transmittance of P-polarized light such as shown in FIG. 17 is moderated. This effect is obtained by setting the incident angle to be 57° which is shifted from both of the Brewster's angles determined for the multilayer films consisting of silicon oxide and titanium dioxide, and dialuminum trioxide and titanium dioxide.

Figure 3:
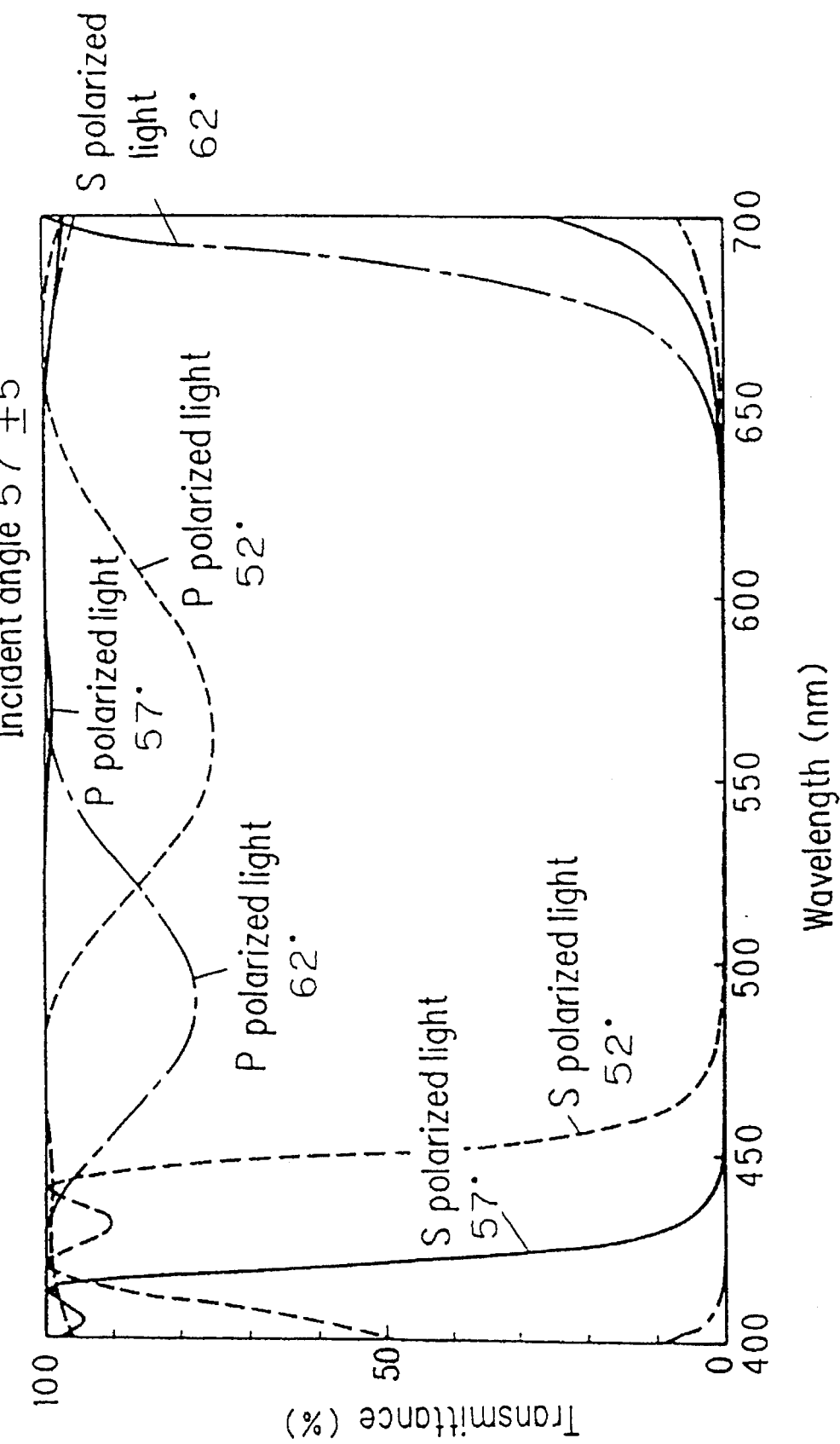
FIG. 3 is a graph illustrating spectral transmittance characteristics of a polarization beam splitter of the invention.

FIG. 3 shows the spectral transmittance characteristics of the polarization beam splitter 11 having the structure of FIG. 1. The characteristics are those in the wavelength band of 400 to 700 nm and obtained in the case where the reference incident angle of light incident on the multilayer film 14 is set to be 57° and the incident angle of light is changed by ±5° from the reference incident angle. It is understood that the transmittance of P-polarized light is as high as 70% or more even when the incident angle of light is changed in the range of 10°. The reduction of the transmittance due to the incident angle dependence is suppressed to a great extent, as compared with the spectral transmittance characteristics of the conventional polarization beam splitter shown in FIG. 17. Also, it is seen that the transmittance of S-polarized light is sufficiently small or not greater than 0.5% over a wavelength band of 100 nm or wider. In this way, the polarization beam splitter of the invention has a high polarization splitter performance.

When the polarization beam splitter of the invention is used in a projection display apparatus with a reflection birefringent light valve, it is required to exhibit a high reflectance performance for S-polarized light in order to display a high-contrast projection image. The reflectance for S-polarized light can be enhanced by increasing the number of layers of the multilayer film. In order to obtain a projection image with a sufficient contrast, it is preferable to set the number of layers including the multilayer film used in the projection display apparatus of the invention, to be at least 13 or more. This is also applicable to multilayer films used in projection display apparatuses of other examples described later.

When the polarization beam splitter of the invention is used in a projection display apparatus with a reflection birefringent light valve, P-polarized light, which is unnecessary light to form a display image, passes through the exit plane 18 shown in FIG. 1. In this case, there may arise a case where a part of the P-polarized light is again reflected by the exit plane 18 and exits toward the screen, thereby deteriorating the contrast of a projection image. The contrast reduction in such a case can be prevented from occurring by forming the exit plane 18 into a face having minute ruggedness, and providing light absorbing means on the outer side of the face. The light absorbing means may be obtained by coating a light absorbing paint material onto the outer side of the face.

The light incident angle to the multilayer film and the structure of the multilayer film used in the polarization beam splitter of the invention are not limited to those of the example. Other incident angles, and structures may be employed, provided that the combinations of the refractive indices of the glass prism and the thin layers satisfy the conditions of expressions (2), (3) and (4).

Example 2

Figure 4:
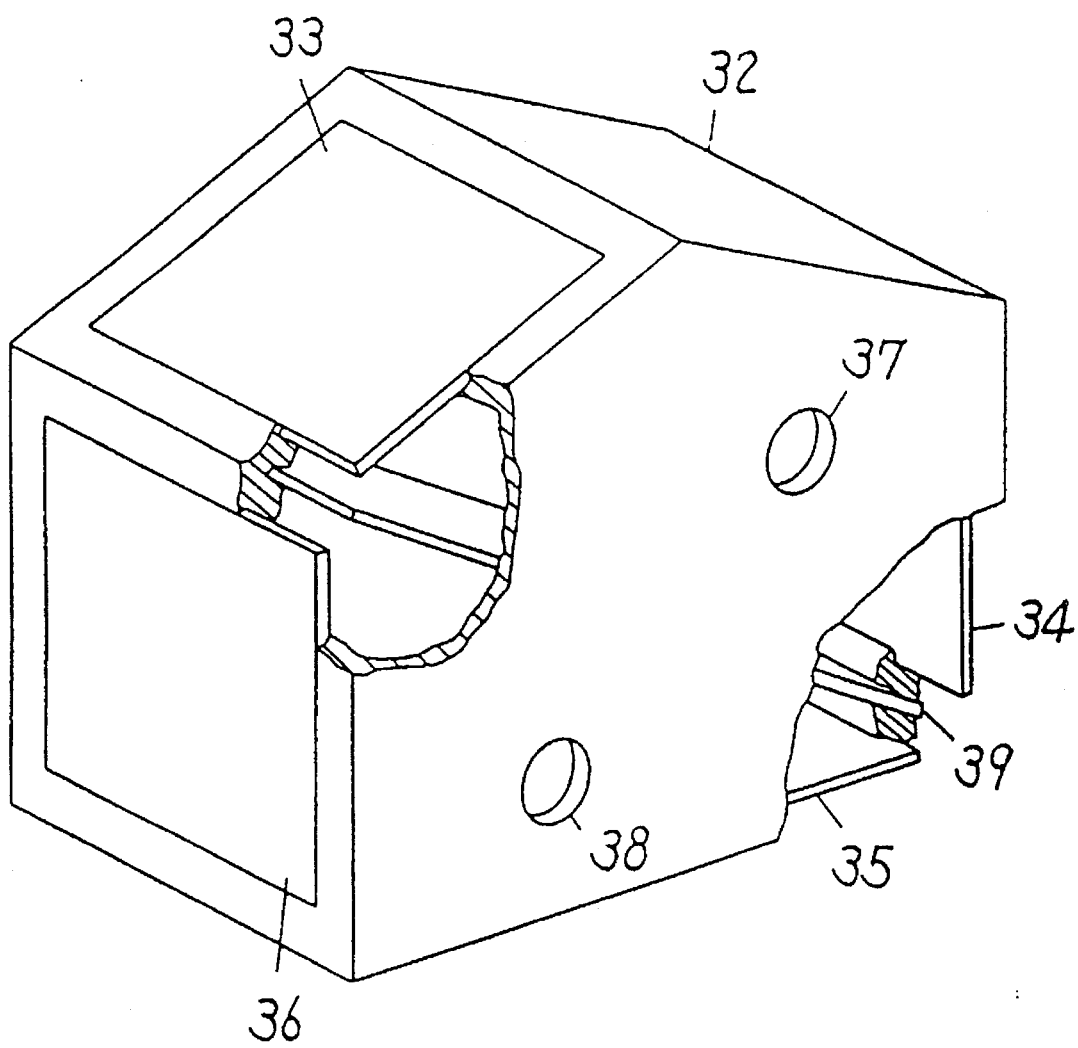
FIG. 4 is a partially cutaway perspective view of another polarization beam splitter of the invention.

Hereinafter, another example of the polarization beam splitter of the invention will be described. FIG. 4 shows another structure of the polarization beam splitter of the invention in which four transparent glass plates 33 to 36 are attached to a frame 32 to constitute a container for holding a liquid. The four glass plates 33 to 36 function as entrance or an exit windows. A polarization split mirror 39 is inserted inside the frame 32 so as to form an angle of 66° to the transparent plates 33 and 34. A transparent filling material which is in a liquid state at least in an assembling process is put into the container via filling In the polarization split mirror 39, a multi-layer film ($\lambda_0$=720 nm) structured in the same manner as that of FIG. 2 is formed on one face of a float glass plate of a refractive index of 1.52 and a thickness of 1 mm. The polarization split mirror 39 contacts the surrounding transparent filling material, so that the polarization beam splitter 31 is obtained.

Preferably, the transparent filling material is in a liquid state at least during the assembling process. By using the transparent filling material which is in a liquid state in the assembling process, the close contact of the material can easily be accomplished without forming air bubbles at the interfaces of the materials, and the polarization split mirror 39 and the transparent plates 33 to 36. Since a glass substrate which can be used as the transparent plates 33 to 36 is very inexpensive as compared with a glass prism, and the volume of the transparent filling material is small, the material cost is low. Moreover, a process for filling the container with a liquid can be easily conducted. Therefore, the polarization beam splitter of this example can be produced at an extremely lower cost than that of a polarization beam splitter using glass prisms.

The transparent filling material is required to have the following properties: it is colorless and transparent; it has a low solidifying point and a high boiling point; it exhibits very small birefringence; it has a high flash point and a high ignition point; it is chemically stable; it hardly volatilizes; it is harmless; and it can be produced at a low cost. As the liquid material, polyhydric alcohol such as ethylene glycol, or diethylene glycol, a mixture or an aqueous solution of these materials, and silicone oils are useful. In the example, an 80-wt. % aqueous solution of ethylene glycol (refractive index of 1.40) was used as the liquid material.

When a gel material which is in a liquid state during the assembling process and in a solid state after the assembling process is used, there arises no fear that the liquid leaks during the use of the apparatus may occur. An example of such a material is transparent silicone resin KE1051 (refractive index of 1.40) which is produced by SHIN-ETSU Chemical Co., Ltd.

The silicone resin is available in the form of two kinds of liquids, or liquid A and liquid B. Both liquids A and B contain silicone oil represented by chemical formula 1:

(chemical formula 1)

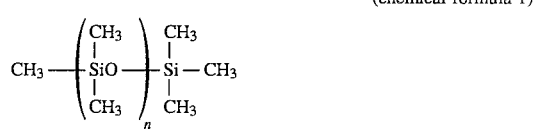

Liquid A further contains the main component represented by chemical formula 2:

(chemical formula 2)

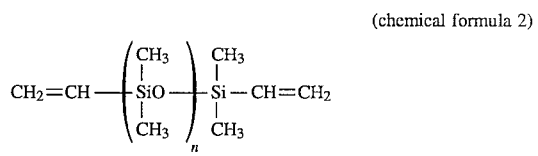

and a minute amount of platinum catalyst. Liquid B further contains a crosslinking agent represented by chemical formula 3:

(chemical formula 3)

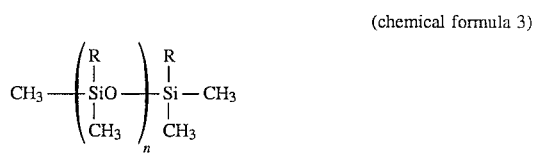

where R indicates $CH_3$ or H. Liquids A and B are mixed with each other, and the mixture is allowed to stand at room temperature or heated. Then vinyl groups of the main component are bonbed to hydrogen of the crosslinking agent to form silicone rubber. The silicone oil remains unchanged before and after the crosslinking reaction, thereby forming a structure in which the silicone oil is held in a network of silicone rubber. Since this reaction is an addition reaction, a by-product is not principally formed, and the crosslinking reaction proceeds uniformly, both in the surface and inside. The material is gel, and hence can easily be deformed. Even when the material is caused to thermally expand by the ambient temperature, therefore, the whole of the material uniformly changes in volume, and stress is scarcely generated. Consequently, the material has a feature that it exhibits a very small degree of birefringence which must be eliminated so as to obtain a high performance polarization beam splitter. Alternatively, transparent silicone resin which is in a liquid state during the assembling process and changed into gel by irradiation of UV rays may be used as the transparent filling material. An example of such a resin is transparent silicone resin OF113 produced by SHIN-ETSU Chemical Co., Ltd. In the specification, the term "silicone resin" means not only so-called silicone resin but also silicone rubber, silicone gel and these materials containing silicone oils.

In the case where the polarization beam splitter is required to have a high heat resistance, transparent silicone resin may preferably be used. Generally, silicone resin has a higher heat resistance than polyhydric alcohols, and a glass substrate and a multilayer film are excellent in heat resistance. Consequently, the polarization beam splitter can be placed in the vicinity of a light source with a high temperature. In the case where a liquid material is to be used, silicone oil may preferably be used.

Light entering through the transparent plate 33 passes through the transparent filling material, and enters the polarization split mirror 39 at an angle of 66°. Then the light is split into S-polarized light and P-polarized light by the polarization split mirror 39. The S-polarized light passes through the transparent filling material and then passes through the transparent plate 34. The P-polarized light passes through the transparent filling material and then is transmitted through the transparent plate 35.

In the same manner as the above-mentioned example, also the polarization beam splitter 31 is structured so that the multilayer film formed on the polarization split mirror 39 has a 13-layer structure which is composed of a combination of alternating layers of silicon dioxide of a refractive index of 1.46 and titanium dioxide of a refractive index of 2.30, and alternating layers of dialuminum trioxide of a refractive index of 1.62 and titanium dioxide of a refractive index of 2.30. When, from two Brewster's angles of 61.7° and 71.1° obtained from expressions (3) and (4), the reference incident angle of light is set so as to be between 61.7° and 71.1° as indicated by expression (2), the extent of variation of the transmittance of P-polarized light which is caused by the change of the incident angle is small. Therefore, it is possible to suppress the reduction of the transmittance of P-polarized light which is due to the incident angle dependence.

Figure 5:
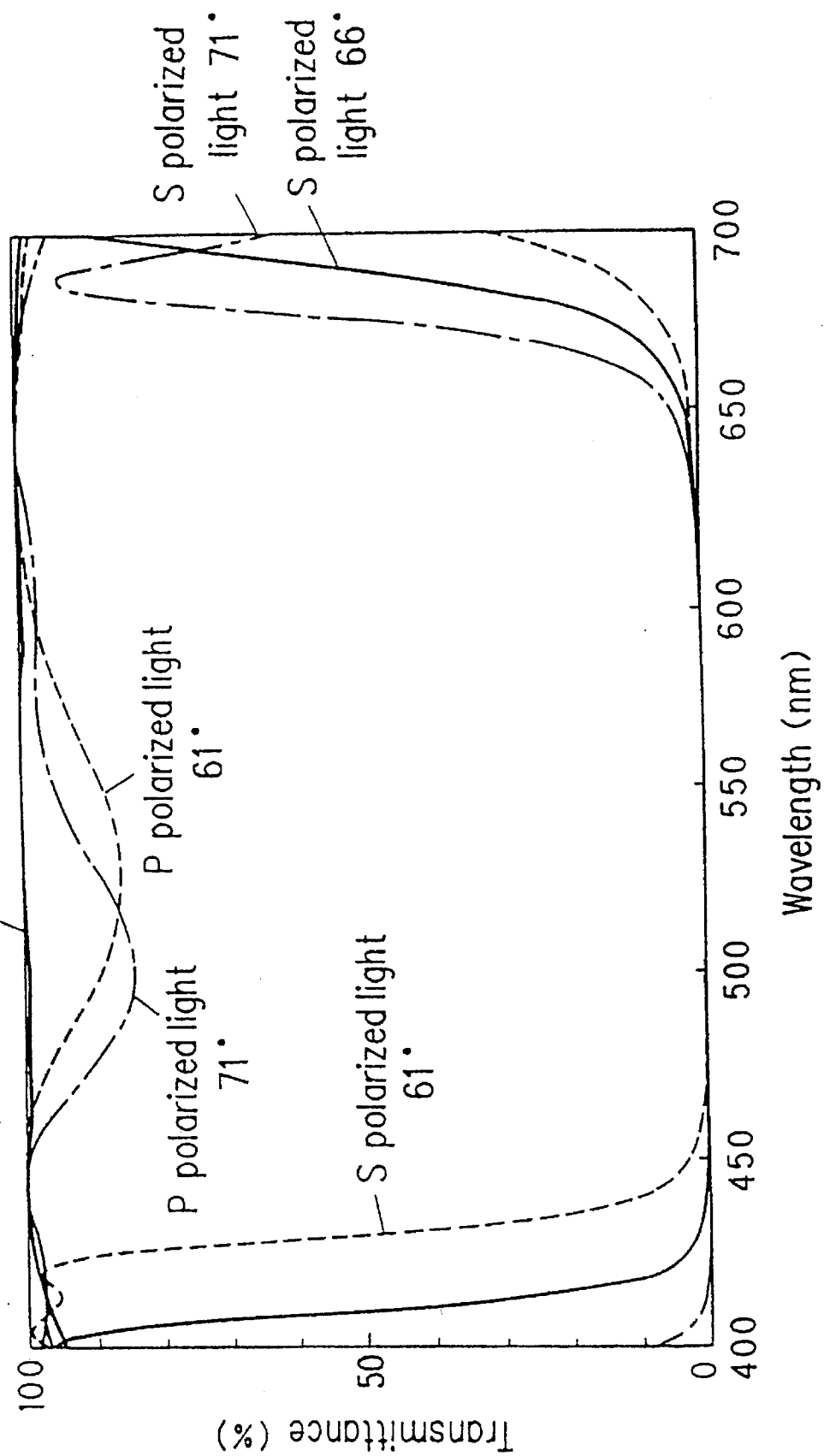
FIG. 5 is a graph illustrating spectral transmittance characteristics of another polarization beam splitter of the invention.

FIG. 5 shows the spectral transmittance characteristics of the polarization beam splitter 31. The characteristics are obtained in the wavelength band of 400 to 700 nm and in the case where the reference incident angle of light incident on the polarization split mirror 39 is set to be 66° and the incident angle of light is changed by ±5° from the reference incident angle. It is understood that, also in this case, the transmittance of P-polarized light is as high as 80% or more even when the incident angle of light is changed in the range of 10°, and the reduction of the transmittance due to the incident angle dependence is suppressed to a great extent.

When the polarization beam splitter of the invention is used in a projection display apparatus with a reflection birefringent light valve, P-polarized light, which is unnecessary to display an image, passes through the transparent plate 35 shown in FIG. 4. Also in this case, there may arise a case where a part of the P-polarized light is again reflected by the transparent plate 35 to exit toward the screen, thereby deteriorating the contrast of a projection image. In such a case, the contrast reduction can be prevented from occurring by removing the transparent plate 35, using a frame in which no window is formed at the portion corresponding to the transparent plate 35, forming the entrance plane of P-polarized light into a face having minute ruggedness, and providing light absorption means onto the inner side of the face. The light absorption means may be realized by coating a light absorbing paint material onto the inner side of the face.

Example 3

Hereinafter, an example of the projection display apparatus of the invention will be described.

Figure 6:
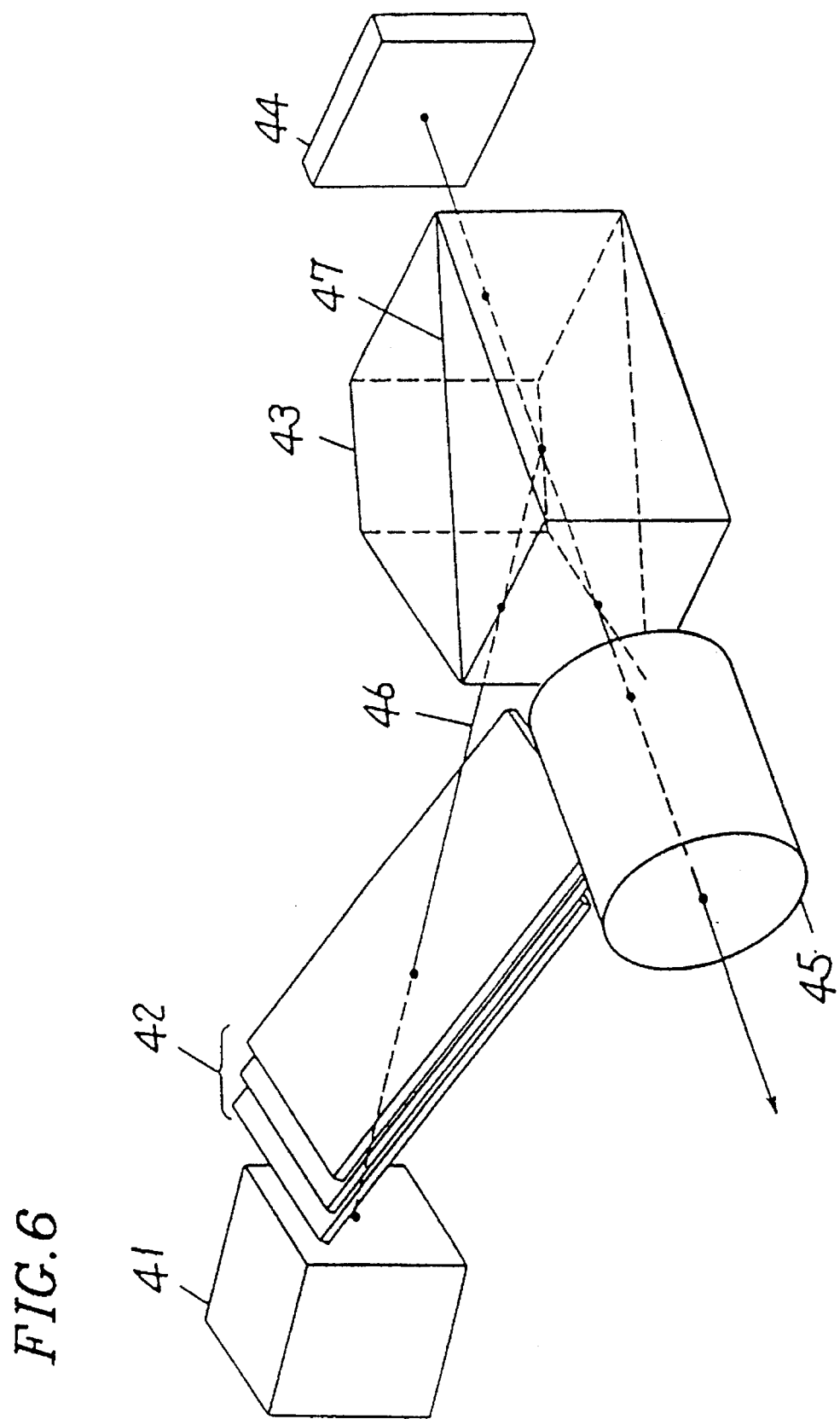
FIG. 6 is a perspective view of a configuration of a projection display apparatus of the invention.

FIG. 6 is a view showing the configuration of an example of the projection display apparatus which uses the polarization beam splitter of the invention. A polarization beam splitter 43 which functions as a polarizer and an analyzer is the same as the polarization beam splitter 11 shown in FIG. 1. In a reflection-type liquid crystal panel 44, twisted nematic liquid crystal is used.

Figure 7A:
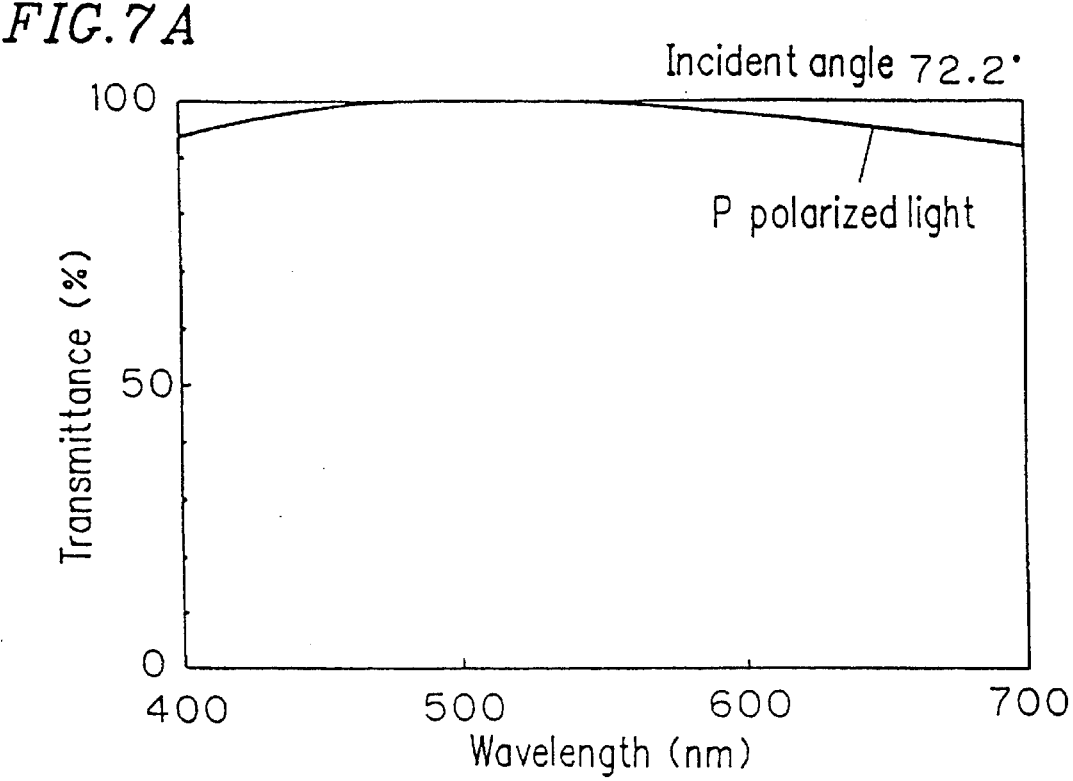
FIGS. 7A and 7B are graphs illustrating spectral transmittance characteristics of a pre-polarizer.
Figure 7B:
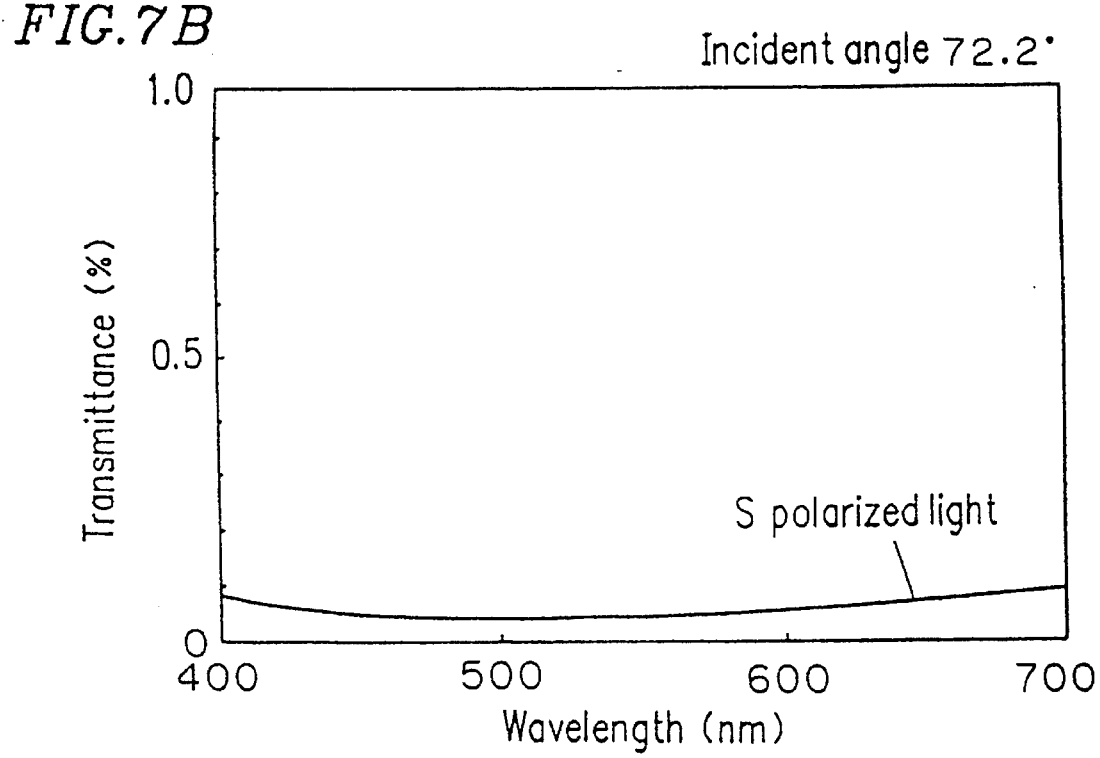

A pre-polarizer 42 has three glass substrates. On both faces of each glass substrate, an optical thin film is formed. The three glass substrates are stacked with air gaps interposed between them. The thickness of the air gaps is preferably greater than an order of a wavelength of visible light so as to prevent an interference phenomenon. The stacked glass substrates are inclined so that the transmittance of P-polarized light at a predetermined wavelength is about 100%. Each optical thin film is made of titanium dioxide (refractive index of 2.30) and a physical thickness of 59.7 nm. Titanium dioxide is known as the material having the highest refractive index among thin film materials which exhibit transparency of a level allowable in practical use. The inclination angle of the glass substrates is set so as to satisfy the incident angle condition of 72.2° at which the transmittance of P-polarized light in the vicinity of the wavelength of 500 nm is 100%. The optical thin films formed on the both faces of each glass substrate have a refractive index higher than that of the glass substrate. Therefore, S-polarized light can be reflected efficiently by a reduced number of surfaces. FIGS. 7A and 7B show the spectral transmittance characteristics of the pre-polarizer 42 at the incident angle of 72.2°. FIG. 7A shows the transmittance of P-polarized light, and FIG. 7B the transmittance of S-polarized light. From FIGS. 7A and 7B, it is understood that, over a wide wavelength band of 400 to 700 nm (visible region), P-polarized light exhibits a high transmittance of 90% or more, and S-polarized light a very low transmittance of 0.1% or less.

The entrance plane of the pre-polarizer 42 (the plane including the normal line to the face on which the thin film is formed, and an optical axis 46) is perpendicular to the entrance plane of the polarization beam splitter 43 (the plane including the normal line to a multilayer film face 47, and an optical axis 46), so that P-polarized light transmitting through the pre-polarizer 42 is reflected by the polarization beam splitter 43 as S-polarized light.

When natural light emitted from a light source 41 enters the pre-polarizer 42, almost linearly polarized light is transmitted. The linearly polarized light enters the polarization beam splitter 43 which functions as a polarizer in this case, and is then reflected by the multilayer film face 47 as S-polarized light toward the liquid crystal panel 44. The S-polarized light incident on the reflection-type liquid crystal panel 44 is reflected with being modulated into elliptically polarized light, and again enters the polarization beam splitter 43 which functions as an analyzer. Among light beams reflected from the liquid crystal panel 44, the light beam converted into P-polarized light passes through the polarization beam splitter 43 and is then projected by a projection lens 45 onto a screen (not shown), and the S-polarized light which has not been converted to P-polarized light is again reflected by the polarization beam splitter 43 and then proceeds toward the light source 41.

As described above, the polarization beam splitter 43 shows small incident angle dependence. The transmittance of P-polarized light is as high as 70% or more over a wide wavelength band of 400 to 700 nm even when the incident angle to the multilayer film face is changed in the range of ±5°. Therefore, the projection display apparatus of the invention can display a projection image which is very bright and has a high light efficiency.

As the polarization beam splitter 43, the polarization beam splitter 11 shown in FIG. 1 is used. Alternatively, the polarization beam splitter 31 shown in FIG. 4 may be used.

Figure 8:
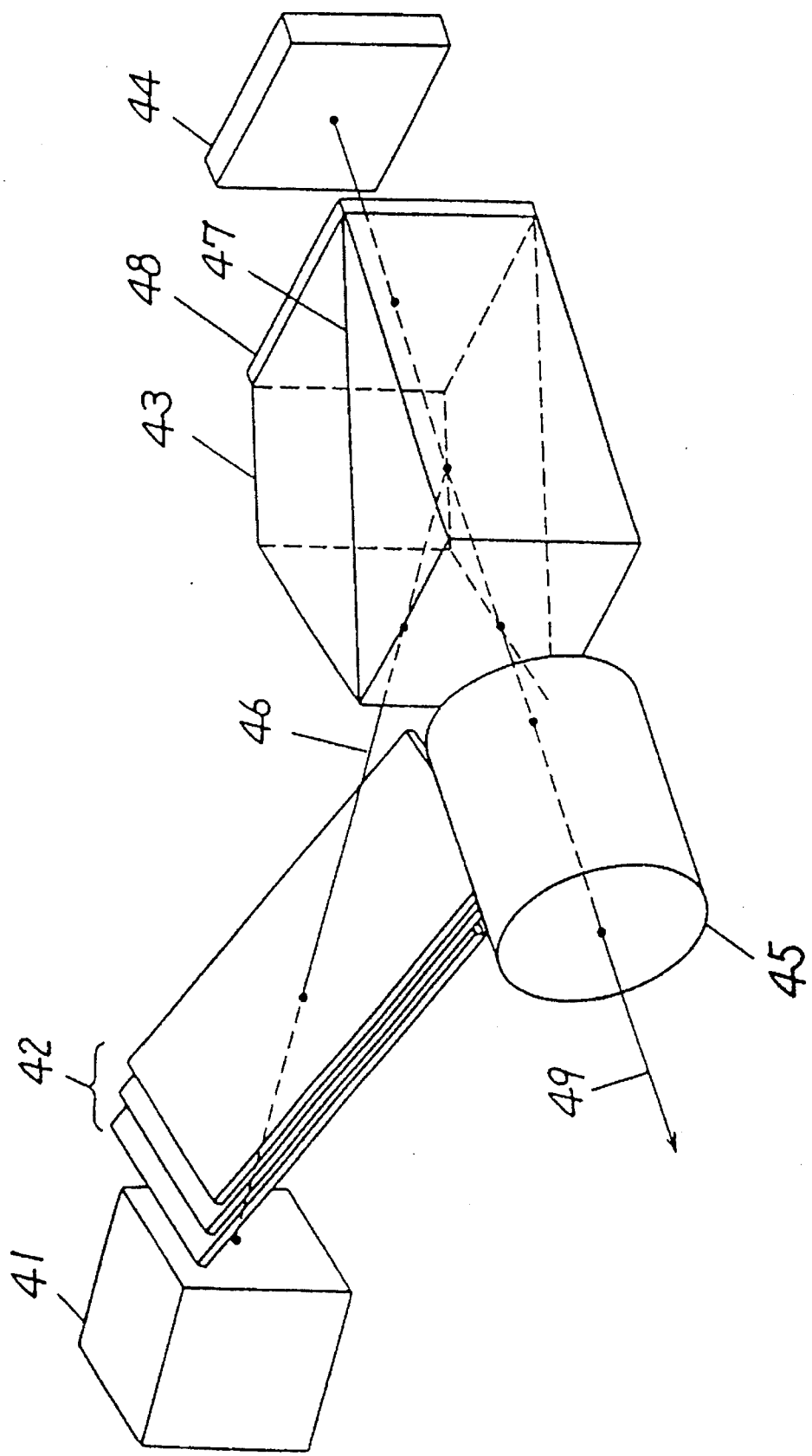
FIG. 8 is a perspective view of a configuration of another polarization beam splitter of the invention.

In the configuration shown in FIG. 6 wherein the polarization beam splitter 43 is used as a polarizer and an analyzer, when the spread angle of incident light is large, the polarization direction of light incident on the analyzer at a largely shifted angle shifts from the optimum polarization direction to the analyzer. Therefore, the contrast of a projection image is lowered. In order to cope with this, as shown in FIG. 8, a quarter wave plate 48 may be disposed between the polarization beam splitter 43 and the liquid crystal panel 44.

The quarter wave plate 48 is designed so that the phase difference of a ¼-wavelength for an approximately central wavelength of light transmitted from the projection lens 45 is attained between light beams polarizing along the faster and slower optic axes. The quarter wave plate 48 is placed so that the faster or slower optic axis is perpendicular to the plane including the incident optical axis 46, and a reflecting optical axis 49.

The details of the function of the quarter wave plate 48 will be described. When a light beam enters the polarization beam splitter 43 inclined with respect to the optical axis 46 in a direction perpendicular to the plane including the optical axes 46 and 49, and is transmitted through the beam splitter 43 and enters the light valve 44 inclined with respect to the optical axis 49 in a direction perpendicular to the plane including the optical axes 46 and 49, a light beam out-going from the polarization beam splitter 43 is linearly polarized in the direction which is rotated with θ from a reference direction. The reference direction is perpendicular to the plane including the optical axes 46 and 49 and the faster or slower optic axis of the quarter plate is set to coincide with the reference direction. The polarization direction of the light beam out-going from the polarization beam splitter 43 is perpendicular to the plane including a propagation direction of the light beam and a normal line to the multilayer film face 47. When a light beam passes through the quarter wave plate 48 twice, the quarter wave plate 48 functions as a half wave plate for the light beam. Accordingly, when the light beam having the polarization direction which is rotated with θ from the slower or faster optic axis passes through the quarter wave palate 48 twice, the polarization direction of the light beam is rotated by −2θ. Therefore, the light beam which has passed the quarter wave plate 48 twice has a polarization direction rotated by −θ with respect to the reference direction. The resultant polarization direction is perpendicular to the plane including a propagating direction of the light beam incident on the beam splitter 43 as an analyzer and the normal line to the multilayer film face 47. This polarization direction is the optimum direction for the beam splitter 43 as an analyzer. If the quarter wave plate is not provided as shown in FIG. 6, the light beam which enters the beam splitter 43 as an analyzer has a polarization direction rotated by 2θ from the optimum direction.

The light which emerges from the polarization beam splitter 43 and is then reflected by the face of the quarter wave plate 48 to the side of the polarization beam splitter 43 cannot be compensated in polarization direction, and therefore constitutes the main cause of contrast deterioration. In order to cope with this, the quarter wave plate 48 may be fixed to the polarization beam splitter 43 by a transparent adhesive, a transparent gluing agent, or the like. According to this configuration, the surface reflection of the quarter wave plate 48 does not occur, and hence the contrast is further improved.

In the case where the polarization beam splitter 31 shown in FIG. 4 is used as the polarization beam splitter, the quarter wave plate 48 may be fixed to the face of the transparent plate 34 in the side of the transparent filling material, attaining the same effects.

The light source 41 comprises a lamp, a collective optical system for collimating the light emitted from the lamp, and a filter for cutting UV and IR rays. In the example, a metal halide lamp is used as the light source. Alternatively, a lamp of another kind such as a tungsten halogen lamp, or a xenon lamp may be used.

Example 4

Hereinafter, another example of the projection display apparatus of the invention will be described.

Figure 9:
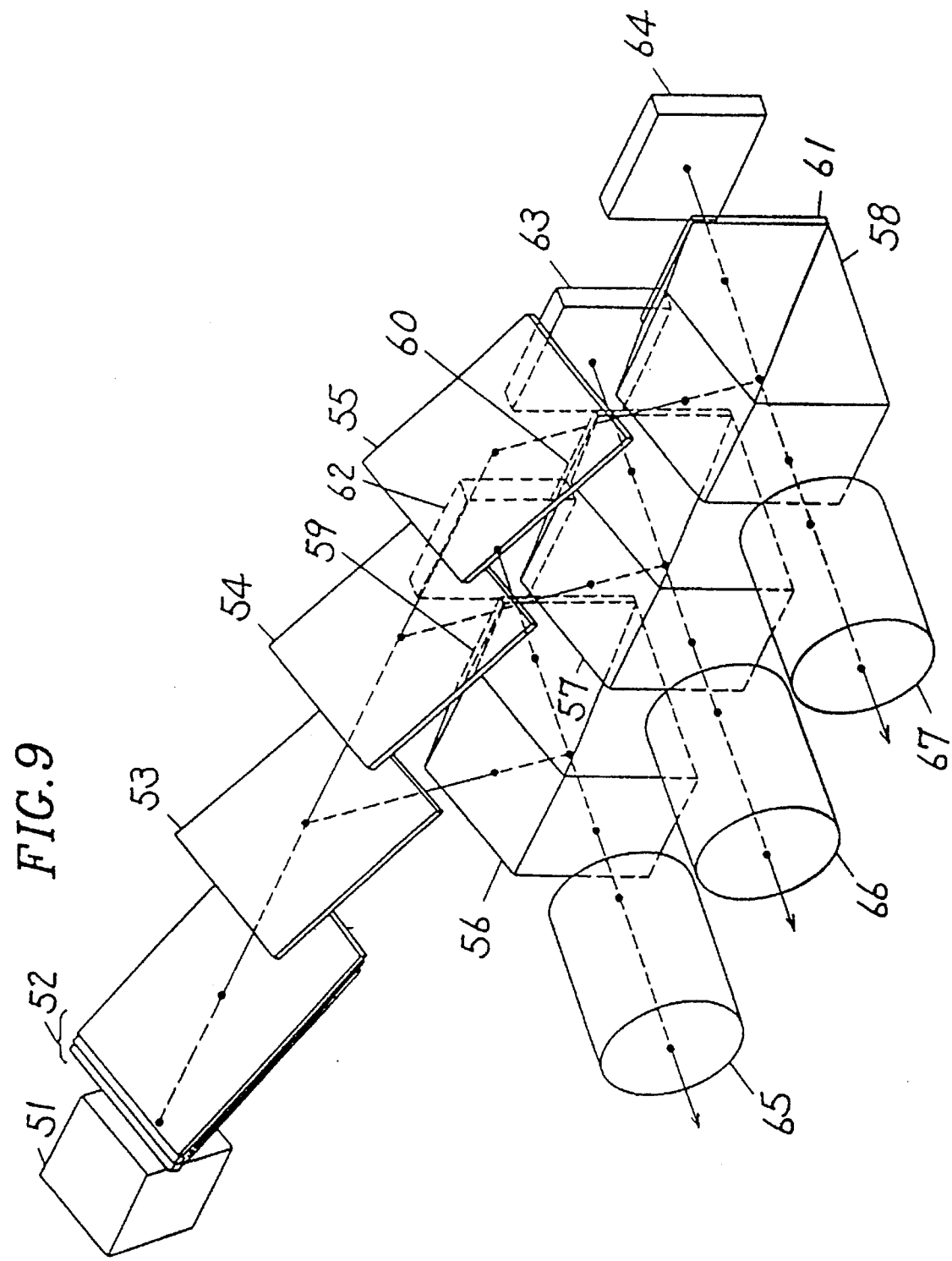
FIG. 9 is a perspective view of a configuration of another projection display apparatus of the invention.

FIG. 9 shows the configuration of the example wherein a light source 51, a pre-polarizer 52, and liquid crystal panels 62, 63 and 64 are the same as corresponding ones of the foregoing example. Polarization beam splitters 56, 57 and 58 have the same structure as that of the polarization beam splitter 11 of in FIG. 1. However, each of the multilayer films of the polarization beam splitters 56, 57 and 58 is designed based on a different main wavelength of design which respectively corresponds to each of three color light beams which are separated by a color separation optical system. Quarter wave plates 59, 60 and 61 are designed based on the phase difference for the light beams of the central wavelengths of the three color light beams, respectively.

The light source 51 emits light including the primary colors, or red, green and blue components. The light from the light source 51 enters the pre-polarizer 52, and linearly polarized light is transmitted therefrom. The linearly polarized light is separated into three colors, red, green and blue light beams by a combination of a blue-reflection dichroic mirror 53, a green-reflection dichroic mirror 54, and a red-reflection dichroic mirror 55. The three color light beams enter the respective polarization beam splitters 56, 57 and 58 which function as polarizers, and are then reflected as S-polarized light beams. Thereafter, the light beams enter the respective reflection-type liquid crystal panels 62, 63 and 64 via the quarter wave plates 59, 60 and 61. The light beams reflected by the liquid crystal panels 62, 63 and 64 are modulated into elliptically polarized light and then again pass through the quarter wave plates 59, 60 and 61 to enter the polarization beam splitters 56, 57 and 58 which function as analyzers. Among light beams reflected from the liquid crystal panels 62, 63 and 64, the light beams converted into P-polarized light beams pass through the polarization beam splitters 56, 57 and 58 and are then projected by projection lenses 65, 66 and 67 onto a screen (not shown) to be synthesized with each other. The S-polarized light beams which have not been converted to the P-polarized light beams are again reflected by the polarization beam splitters 56, 57 and 58 and then proceed toward the light source 51.

Also in the projection display apparatus of the example, the polarization beam splitters 56, 57 and 58 have a small incident angle dependence in their transmittance characteristics, and show a transmittance of P-polarized light which is as high as 70% or more even when the incident angle to the multilayer film face is changed in the range of ±5° from the reference incident angle. Therefore, the projection display apparatus of the invention can display a projection image which is very bright and has a high light efficiency.

Also in the projection display apparatus of the example, the polarization beam splitters 56, 57 and 58 have the same configuration as that of the polarization beam splitter 11 shown in FIG. 1. Alternatively, the polarization beam splitters may have the same structure as that of the polarization beam splitter 31 shown in FIG. 4.

Example 5

Hereinafter, another example of the polarization beam splitter of the invention will be described.

Two kinds of multilayer films having different spectral transmittance characteristics are used so as to provide the following advantages.

(1) With respect to P-polarized light, the incident angle dependence of the transmittance is suppressed in the same manner as the foregoing example.

(2) With respect to S-polarized light, the transmittance is decreased to a very low level over the wavelengths of the whole visible light region and the incident angle dependence in a usable wavelength band is suppressed.

Figure 10:
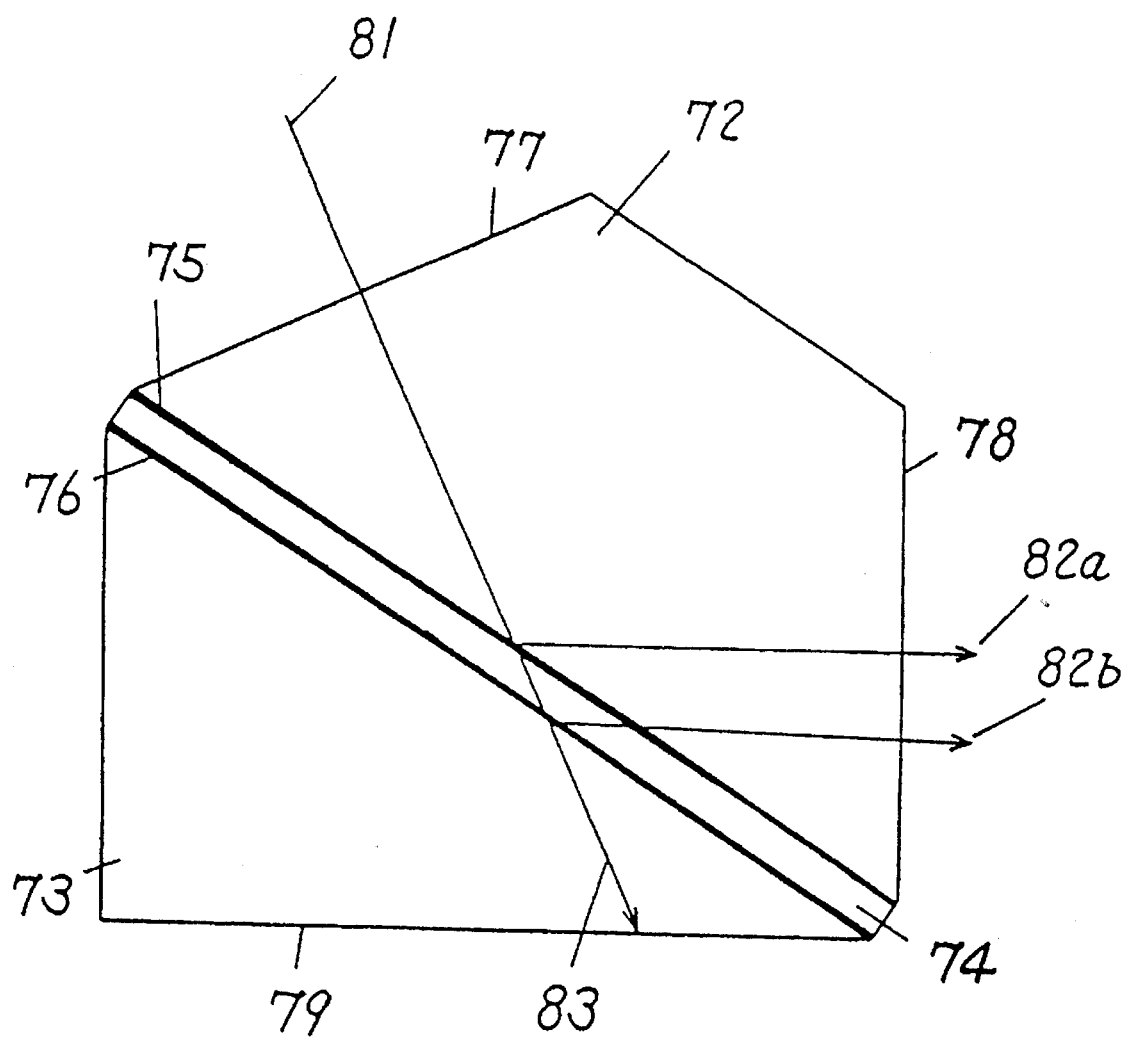
FIG. 10 is a side section view of another polarization beam splitter of the invention.

FIG. 10 shows the structure of an example of the polarization beam splitter of the invention. A glass prism 72 is a quadrangular prism having a trapezoid section shape which is obtained by partially cutting off an isosceles triangle, a glass prism 73 which is a triangular prism, and a glass substrate 74 which is a glass plate having a thickness of 1 mm. These prisms and plate are made of borosilicate crown glass of a refractive index of 1.52.

A first multilayer film 75, and a second multilayer film 76 are formed on both faces of the glass substrate 74, respectively. The glass prisms 72 and 73 are attached together in such a manner that the first multilayer film 75, the glass substrate 74 and the second multilayer film 76 are sandwiched therebetween. The first and second multilayer films 75 and 76 are respectively placed so as to form an angle of 57° to planes 77 and 78, and closely contact the glass prisms 72 and 73, and the glass substrate 74, so that a polarization beam splitter 71 is obtained. Light 81 entering through the plane 77 is split by the first and second multilayer films 75 and 76 into S-polarized light beams 82a and 82b transmitting through the plane 78, and P-polarized light 83 transmitting through a plane 79.

The first multilayer film 75 has the same structure as that shown in FIG. 2, or a 13-layer structure ($\lambda_0$=840 nm) in which silicon dioxide (refractive index $n_L$=1.46) is used for low refractive index layers, dialuminum trioxide (refractive index $n_M$=1.62) for intermediate refractive index layers, and titanium dioxide (refractive index $n_H$=2.30) for high refractive index layers. The second multilayer film 76 has a 15-layer structure ($\lambda_0$=580 nm) in which two kinds of thin layers or silicon dioxide and titanium dioxide are alternately stacked, and the odd-numbered layers counted from the side of the glass substrate 74 are made of silicon dioxide and the even-numbered layers are made of titanium dioxide. The first and fifteenth layers counted from the side of the glass substrate 74 have an optical thickness of $\lambda_0/8$, and the other layers an optical thickness of $\lambda_0/4$.

Figure 11:
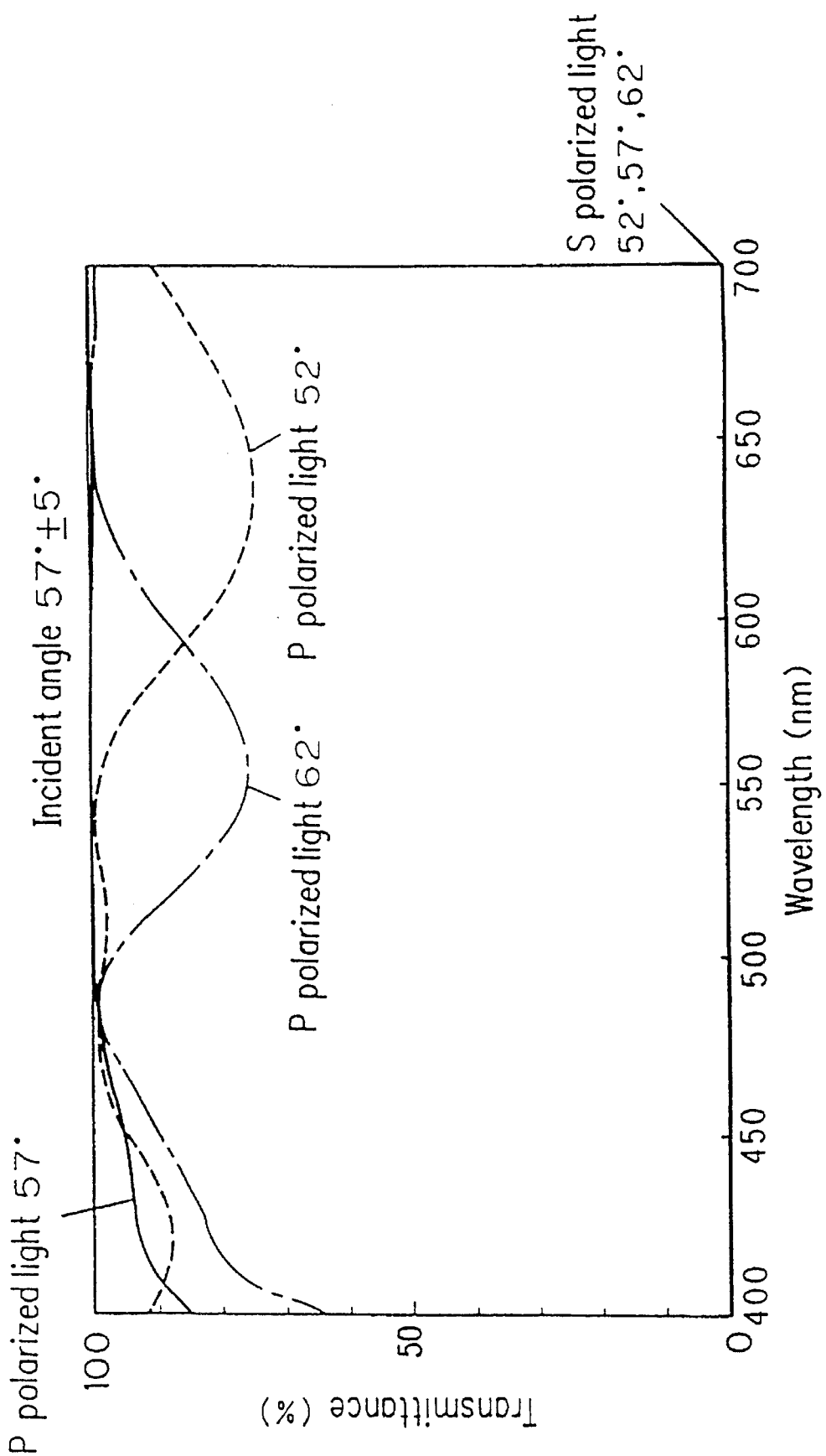
FIG. 11 is a graph illustrating spectral transmittance characteristics of another polarization beam splitter of the invention.

FIG. 11 shows spectral transmittance characteristics of the polarization beam splitter 71 having the structure shown in FIG. 10. The characteristics are obtained in the wavelength band of 400 to 700 nm and in the case where the reference incident angle of light incident on the multilayer film 75 is set to be 57° and the incident angle is changed by ±5°. It is understood that the transmittance of P-polarized light is as high as 70% or more even when the incident angle of light is changed in the range of 10° from the reference incident angle, and, over a wide wavelength band of 400 to 700 nm, the transmittance of S-polarized light is very low or 0.3% or less. Namely, the beam splitter 71 has a high polarization split performance over a vary wide wavelength band.

The first and second multilayer films 75 and 76 are designed based on different main wavelengths of design $\lambda_0$, and hence S-polarized light beams of different wavelength bands are reflected. In other words, the first multilayer film 75 is designed based on the longer main wavelength of design $\lambda_0$ so as to reflect light of a longer wavelength, the second multilayer film 76 is designed based on the shorter main wavelength of design $\lambda_0$ so as to reflect light of a shorter wavelength. Therefore, the total spectral transmittance characteristics of S-polarized light is very small over a very wide band, and the wavelength shift due to the incident angle dependence can be eliminated in a usable wavelength band. Since the first multilayer film 75 is structured in the same manner as that of FIG. 2, the transmittance characteristics of P-polarized-light has a small incident angle dependence of transmittance in the same manner as the foregoing example. In the second multilayer film 76, the transmittance of P-polarized light is largely changed due to the incident angle dependence. In the second multilayer film, however, the main wavelength of design is short, and hence the wavelength region where the transmittance is largely decreased exists only in the UV region. In the case where the polarization beam splitter is used in a projection display apparatus using visible light, accordingly, the above-mentioned large change of the transmittance of P-polarized light does not produce a serious problem.

In the polarization beam splitter 71 shown in FIG. 10, the first and second multilayer films 75 and 76 have different structures. Alternatively, both the multilayer films may be structured in the same manner as that shown in FIG. 2 so as to be different only in their main wavelength of design.

Figure 12:
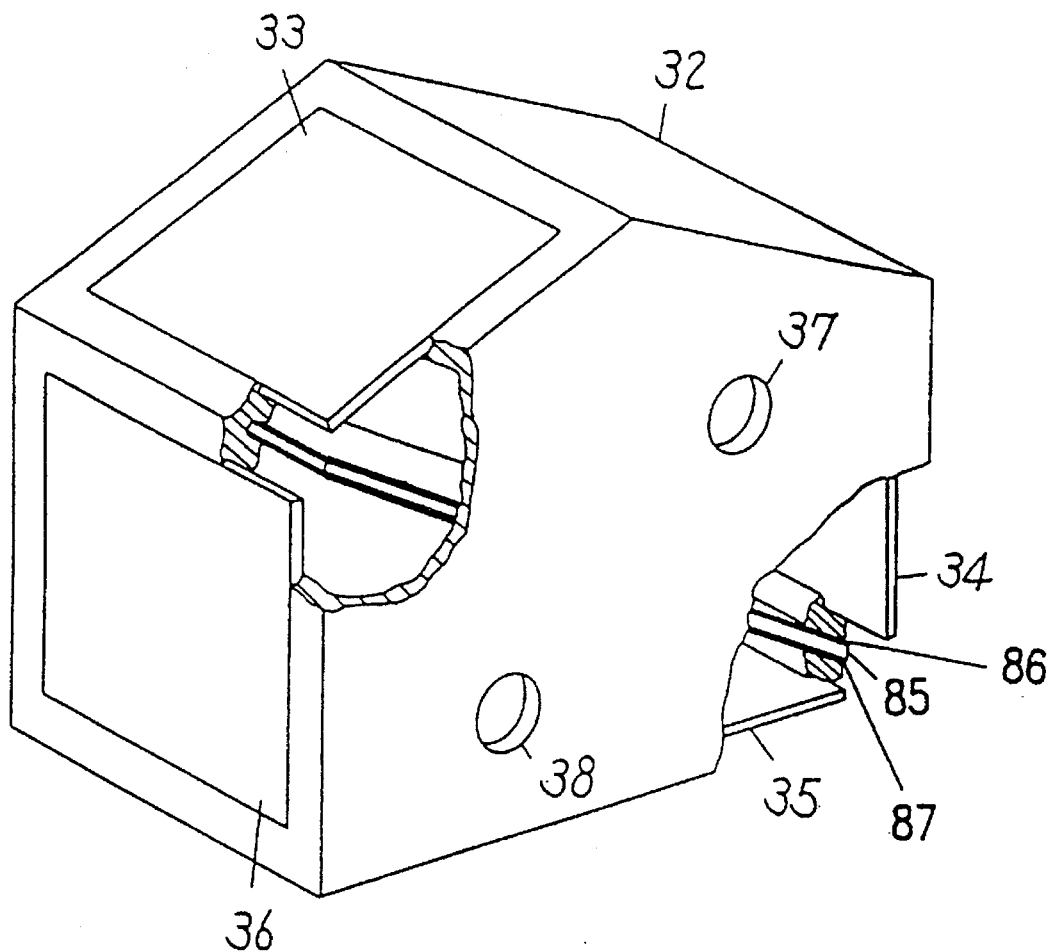
FIG. 12 is a partially cutaway perspective view of another polarization beam splitter of the invention.

In place of the polarization split mirror 39 of the polarization beam splitter 31, a polarization beam splitter 84 shown in FIG. 12 may used. In the beam splitter 84, first and second multilayer films 86 and 87 are respectively formed on the both faces of a glass substrate 85 in the same manner as the structure of FIG. 10. Also this structure can attain the same effects as those of the present example.

Figure 13:
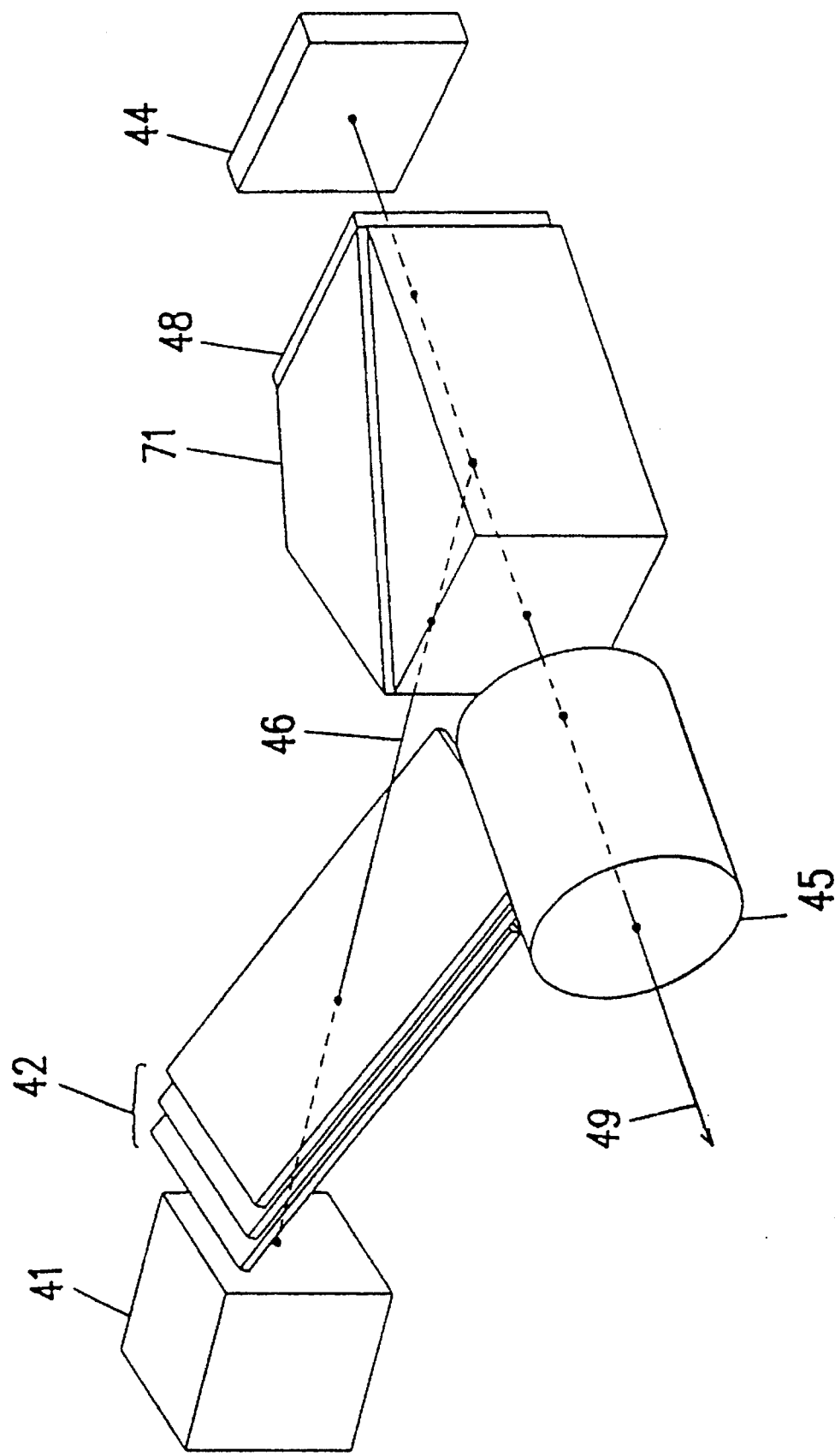
FIG. 13 is a perspective view of a configuration of another projection display apparatus of the invention.

FIG. 13 shows the case where the polarization beam splitter 43 used in the projection display apparatus shown in FIG. 8 is replaced with the polarization beam splitter 71 shown in FIG. 10. The use of the polarization beam splitter 71 allows light from the light source 41 to be utilized over a wide wavelength band so that the projection image is further brightened. Also in this case, the polarization beam splitter 84 shown in FIG. 12 may be used in place of the polarization beam splitter 71.

Example 6

Hereinafter, a further example of the projection display apparatus of the invention will be described.

Figure 14:
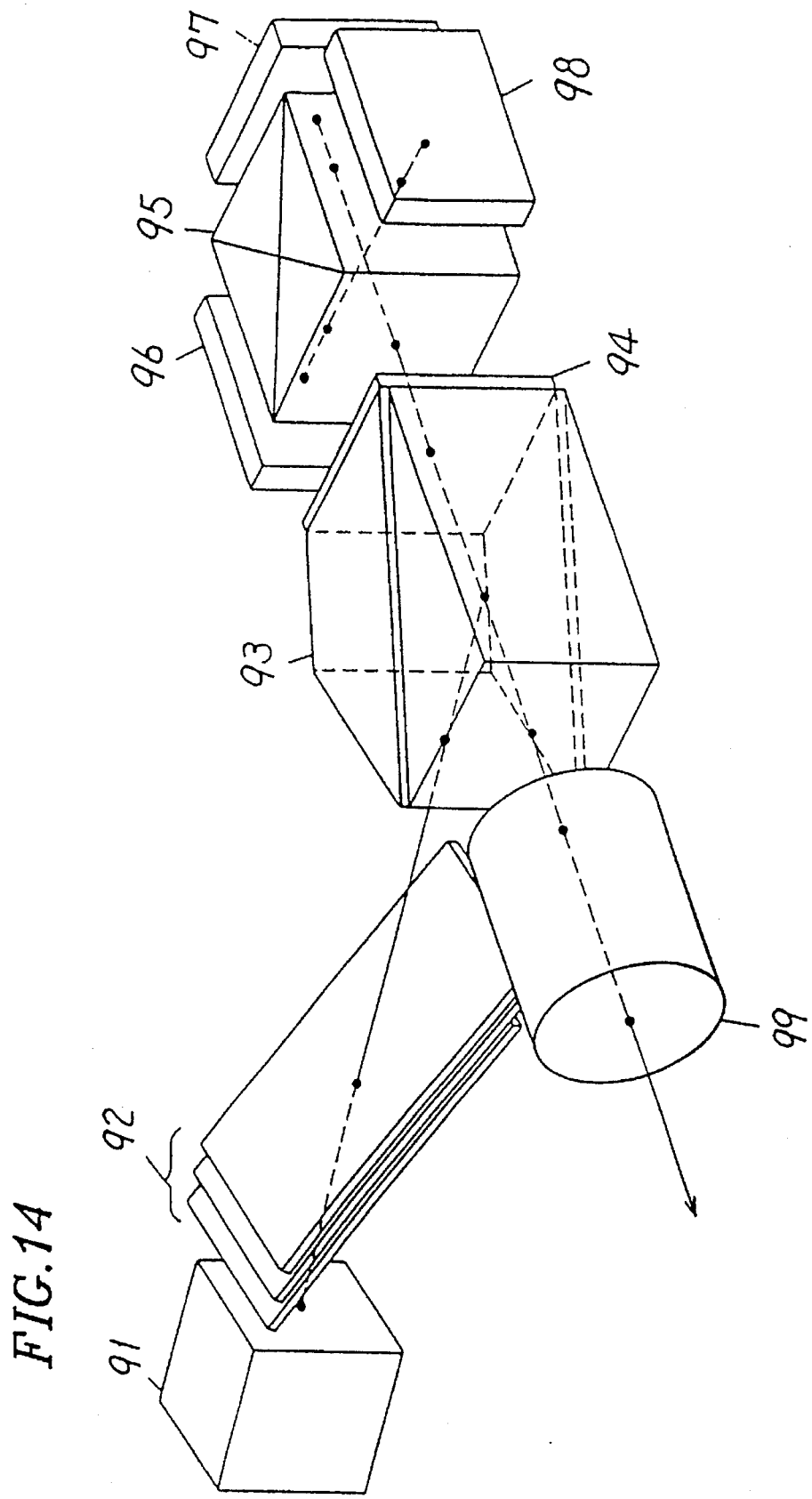
FIG. 14 is a perspective view of a configuration of another projection display apparatus of the invention.

FIG. 14 shows the configuration of an example wherein a pre-polarizer 92, and liquid crystal panels 96, 97 and 98 are the same as the corresponding ones of the example shown in FIG. 9. A polarization beam splitter 93 has the same structure as that of the polarization beam splitter 71 shown in FIG. 10.

A light source 91 emits light including the primary colors, or red, green and blue components. The light from the light source 91 enters the pre-polarizer 92, and substantially linearly polarized light is transmitted therefrom. The linearly polarized light enters the polarization beam splitter 93 which functions as a polarizer, and is then reflected as S-polarized light. Thereafter, the reflected light passes through a quarter wave plate 94, and is separated into three colors of red, green and blue light beams by a dichroic prism 95. The three color light beams enter the respective reflection-type liquid crystal panels 96, 97 and 98, and the reflected light beams are modulated into elliptically polarized light. The three elliptically polarized color light beams again pass through the dichroic prism 95 to be synthesized with each other. The synthesized light enters the polarization beam splitter 93 which functions as an analyzer, via the quarter wave plate 94. Among light beams reflected from the liquid crystal panel 96, 97 and 98, the light converted into P-polarized light passes through the polarization beam splitter 93 and is then projected by a projection lens 99 onto a screen (not shown). The S-polarized light which has not been converted into P-polarized light is again reflected by the polarization beam splitter 93 and then proceeds toward the light source 91.

The projection display apparatus of the example uses the polarization beam splitter 93 of the invention which has a small incident angle dependence of transmittance of P-polarized light, and which has a very small transmittance of S-polarized light over the whole visible range. Therefore, the display of a high-contrast and high brightness projection color image can be obtained by using an only single polarization beam splitter 93.

The quarter wave plate 94 may be fixed to the polarization beam splitter 93 and the dichroic prism 95 in such a manner that it is sandwiched between them. According to this configuration, since undesired light due to reflection at a surface of the quarter wave plate 94 is not produced, the contrast of the projection image is further improved.

Alternatively, three quarter wave plates 94 which are designed based on the phase differences between light beams polarizing along their faster and slower optic axes respectively corresponding to the central wavelengths of the red, green and blue light beams may be disposed between the liquid crystal panel 96, 97 and 98, and the dichroic prism 95.

Figure 15:
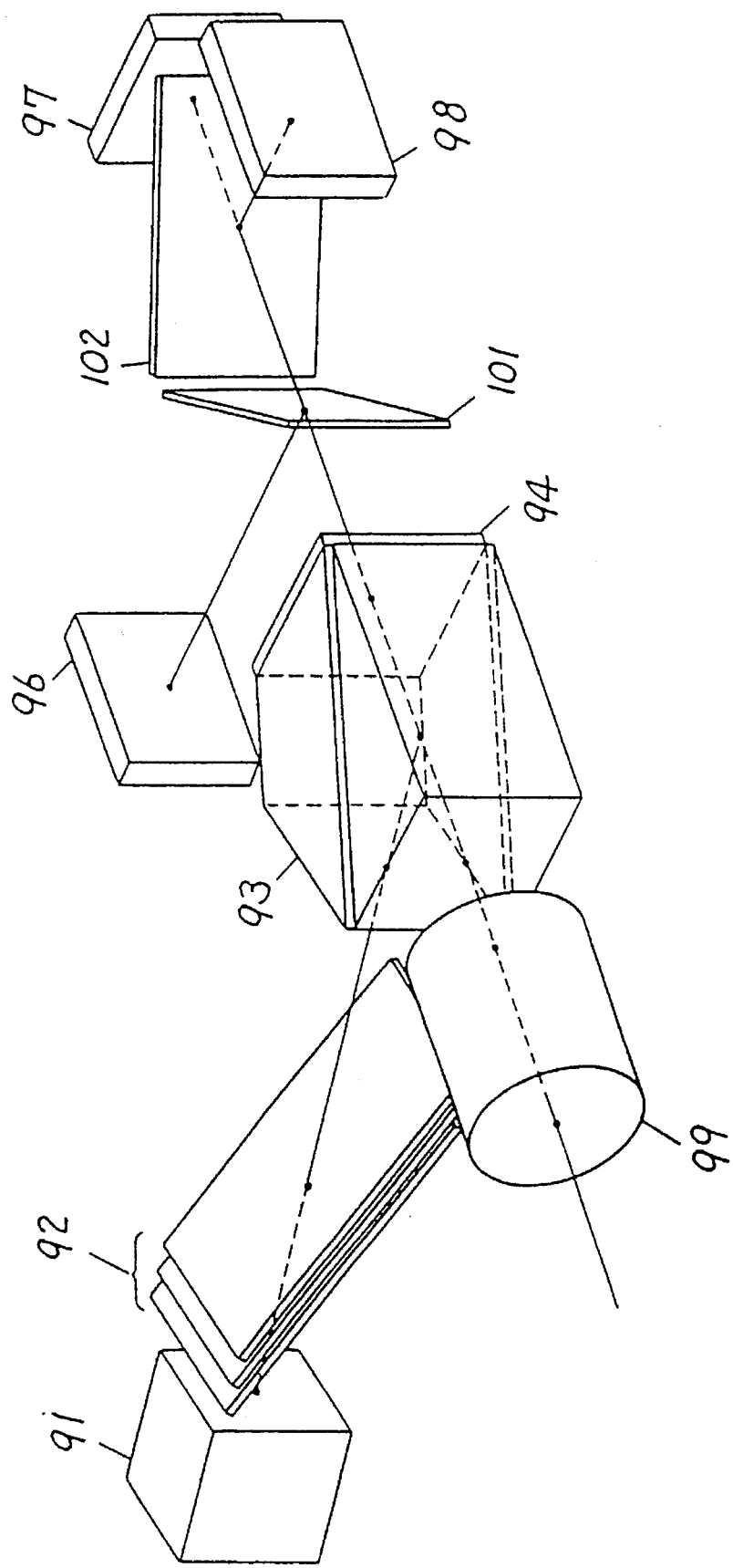
FIG. 15 is a perspective view of a configuration of another projection display apparatus of the invention.
Figure 16:
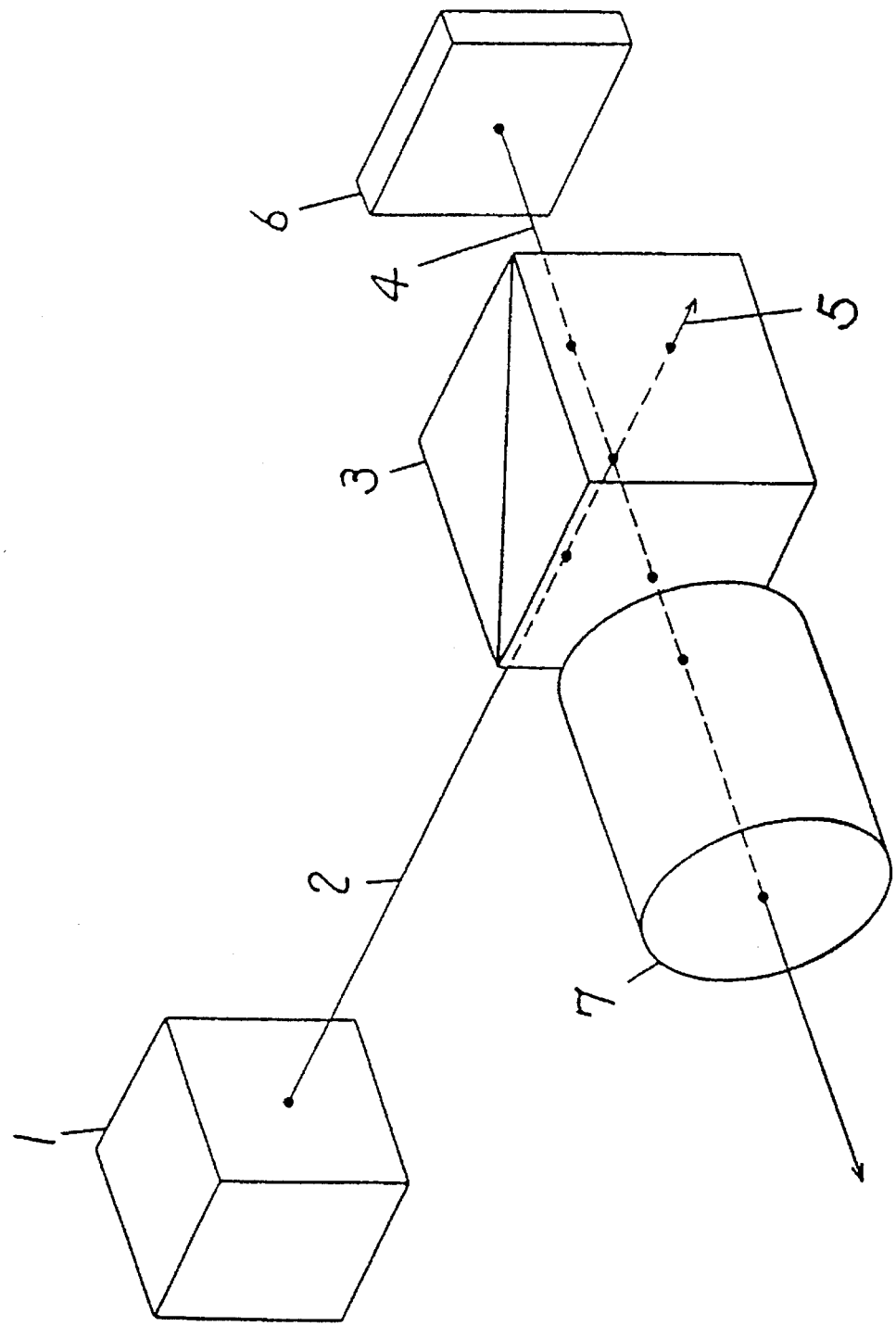
FIG. 16 is a perspective view of a configuration of a projection display apparatus of the prior art.

In the configuration shown in FIG. 14, the dichroic prism 95 in which the color separation planes are crossed with each other to form an X-like shape is used as the color separation optical system for separating light emitted from the light source 91 into the three colors. The optical system may be configured so that two color separation mirrors 101 and 102 are used as shown in FIG. 15.

The light source 91 comprises a lamp, a collective optical system for collimating the light emitted from the lamp, and a filter for cutting UV and IR rays. In the example, a metal halide lamp is used as the light source. Alternatively, a lamp of another kind such as a tungsten halogen lamp, or a xenon lamp may be used.

In the examples described above, a liquid crystal display is used as a light valve. Any means such as an electro-optic crystal which can form an optical image in the form of a change of birefringence in accordance with a video signal may be used as a light valve.

As described above, according to the invention, a multilayer film structure which is based on a combination of thin layers having three different refractive indices is employed, thereby providing a polarization beam splitter in which the transmittance of P-polarized light is hardly lowered or the deterioration of performance due to the incident angle dependence of transmittance is small. When a structure wherein a transparent parallel flat plate having two multilayer films is sandwiched between two transparent bodies is employed, a polarization beam splitter is provided in which the reflectivity for S-polarized light is very high over a wide wavelength band, and which has a suppressed incident angle dependence. When such a polarization beam splitter is used, moreover, the invention can provide a projection display apparatus which can display a highly bright and high-contrast projection image, and hence attain very excellent effects.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A polarization beam splitter comprising a first prism, a second prism, and a dielectric multilayer film which is sandwiched between said first and second prisms, said dielectric multilayer film comprising: first alternating layers of a high refractive index layer having a refractive index higher than refractive indices of said first and second prism and an intermediate refractive index layer having a refractive index lower than the refractive index of said high refractive index layer; and second alternating layers of said high refractive index layer and a low refractive index layer having a refractive index lower than the refractive index of said intermediate refractive index layer, a reference incident angle $\theta_0$ of light which is incident on said dielectric multilayer film through said first or second prism being within a range indicated in the following expression:

$$\theta_1 < \theta_0 < \theta_2$$

where $$\sin^2 \theta_1 = \frac{n_L^2 n_H^2}{n_0^2(n_L^2 + n_H^2)}$$

and $$\sin^2 \theta_2 = \frac{n_M^2 n_H^2}{n_0^2(n_M^2 + n_H^2)}$$

wherein $n_H$ indicates the refractive index of said high refractive index layer, $n_M$ indicates the refractive index of said intermediate refractive index layer, $n_L$ indicates the refractive index of said low refractive index layer, and $n_0$ indicates the refractive indices of said first and second prisms.

2. A polarization beam splitter according to claim 1, wherein said first and second prisms are made of a glass material.

3. A polarization beam splitter according to claim 1, wherein said first and second prisms are made of a transparent filling material which fills a transparent container having a transparent parallel flat substrate, said dielectric multilayer film being formed above one face of said substrate.

4. A polarization beam splitter according to claim 3, wherein said transparent filling material contains at least one of ethylene glycol, diethylene glycol, and propylene glycol.

5. A polarization beam splitter according to claim 3, wherein said transparent filling material is a silicone resin which is cured in said container.

6. A polarization beam splitter according to claim 1, wherein said dielectric multilayer film consists of at least 13 dielectric layers.

7. A polarization beam splitter according to claim 1, wherein, in said dielectric multilayer film, even-numbered layers counted from a side of said first or second prism are said high refractive index layers.

8. A polarization beam splitter according to claim 1, wherein, in said dielectric multilayer film, layers which are respectively nearest to said first and second prisms have an optical thickness which is ⅛ of a predetermined main wavelength of design, and the other layers have an optical thickness which is ¼ of the main wavelength of design.

9. A projection display apparatus comprising: a light source; a pre-polarizer which selectively allows substantially linearly polarized light of light emitted from said light source, to pass through said pre-polarizer; a polarization beam splitter which reflects said linearly polarized light which has passed through said pre-polarizer; a reflection-type light valve which modulates a polarization state of light reflected by said polarization beam splitter, thereby forming an optical image; and a projection lens which projects said optical image formed by said light valve, onto a screen, wherein said polarization beam splitter comprising a first prism, a second prism, and a dielectric multilayer film which is sandwiched between said first and second prisms, said dielectric multilayer film comprising: first alternating layers of a high refractive index layer having a refractive index higher than refractive indices of said first and second prisms and an intermediate refractive index layer having a refractive index lower than the refractive index of said high refractive index layer; and second alternating layers of said high refractive index layer and a low refractive index layer having a refractive index lower than the refractive index of said intermediate refractive index layer, a reference incident angle $\theta_0$ of light which is incident on said dielectric multilayer film through said first or second prism being within a range indicated in the following expression:

$$\theta_1 < \theta_0 \theta_2$$

where $$\sin^2 \theta_1 = \frac{n_L^2 n_H^2}{n_0^2 (n_L^2 + n_H^2)}$$

and $$\sin^2 \theta_2 = \frac{n_M^2 n_H^2}{n_0^2 (n_M^2 + n_H^2)}$$

where $n_H$ indicates the refractive index of said high refractive index layer, $n_M$ indicates the refractive index of said intermediate refractive index layer, $n_L$ indicates the refractive index of said low refractive index layer, and $n_0$ indicates the refractive indices of said first and second prisms, and said polarization beam splitter changes a propagation direction of said linearly polarized light which has passed through said pre-polarizer, to direct said linearly polarized light to said light valve, selectively transmits light which has the polarization state modulated by said light valve, and which has been reflected by said light valve, and directs said selectively transmitted linearly polarized light to said projection lens.

10. A projection display apparatus according to claim 9, wherein said pre-polarizer consists of a plurality of parallel flat plates with air gaps interposed therebetween, and each of said parallel flat plates comprises a substrate, and thin films respectively formed on both faces of said substrate, said thin films having a refractive index higher than a refractive index of said substrate.

11. A projection display apparatus according to claim 9, wherein a quarter wave plate is placed between said polarization beam splitter and said light valve, and one of the faster and slower optic axes of said quarter wave plate is perpendicular to a plane including an incident optical axis of light, and an exit optical axis of S-polarized light reflected from said polarization beam splitter.

12. A projection display apparatus comprising: a light source which radiates light including three primary color components; a pre-polarizer which selectively allows substantially linearly polarized light of light radiated from said light source, to pass through said pre-polarizer; color separation means for separating light output from said pre-polarization beam splitter into three primary color light beams; three polarization beam splitters which function as polarizers and analyzers, and which respectively correspond to said three primary color light beams; three reflection light valves which respectively modulate polarization states of light beams entering from said three polarization beam splitters, thereby forming optical images; and three projection lenses which respectively project said optical images formed by said three light valves, onto a screen, each of said three polarization beam splitters comprising a first prism, a second prism, and a dielectric multilayer film which is sandwiched between said first and second prisms, said dielectric multilayer film comprising: first alternating layers of a high refractive index layer having a refractive index higher than refractive indices of said first and second prisms and an intermediate refractive index layer having a refractive index lower than the refractive index of said high refractive index layer; and second alternating layers of said high refractive index layer and a low refractive index layer having a refractive index lower than the refractive index of said intermediate refractive index layer, a reference incident angle $\theta_0$ of light which is incident on said dielectric multilayer film through said first or second prism being within a range indicated in the following expression:

$$\theta_1 < \theta_0 < \theta_2$$

where $$\sin^2 \theta_1 = \frac{n_L^2 n_H^2}{n_0^2 (n_L^2 + n_H^2)}$$

and $$\sin^2 \theta_2 = \frac{n_M^2 n_H^2}{n_0^2 (n_M^2 + n_H^2)}$$

where $n_H$ indicates the refractive index of said high refractive index layer, $n_M$ indicates the refractive index of said intermediate refractive index layer, $n_L$ indicates the refractive index of said low refractive index layer, and $n_0$ indicates the refractive indices of said first and second prisms.

13. A projection display apparatus according to claim 12, wherein said pre-polarizer consists of a plurality of parallel flat plates with air gaps interposed therebetween, and each of said parallel flat plates comprises a substrate, and thin films respectively formed on both faces of said substrate, said thin films having a refractive index higher than a refractive index of said substrate.

14. A projection display apparatus according to claim 12, wherein quarter wave plates are placed between said polarization beam splitters and said light valves, and one of the faster and slower optic axes of each of said quarter wave plates is perpendicular to a plane including an incident optical axis of light, and an exit optical axis of S-polarized light reflected from said polarization beam splitters.

15. A projection display apparatus according to claim 12, wherein, in each of said three polarization beam splitters, layer constituting said dielectric multi-layer film have different relative film thicknesses in accordance with a wavelength of incident light.

16. A method for splitting a light beam into an S-polarized light beam and a P-polarized beam comprising the steps of:

setting a polarization beam splitter so that said light beam is incident on said polarization beam splitter at a predetermined incident angle, wherein said polarization beam splitter comprises a first prism, a second prism, and a dielectric multilayer film which is sandwiched between said first and second prisms, said dielectric multilayer film comprising: first alternating layers of a high refractive index layer having a refractive index higher than refractive indices of said first and second prisms and an intermediate refractive index layer having a refractive index lower than the refractive index of said high refractive index layer; and second alternating layers of said high refractive index layer and a low refractive index layer having a refractive index lower than the refractive index of said intermediate refractive index layer, and said predetermined incident angle is set to be a reference incident angle $\theta_0$ of light which is incident on said dielectric multilayer film through said first or second prism being within a range indicated by the following conditional expression:

$$\theta_1 < \theta_0 < \theta_2$$

where $$\sin^2\theta_1 = \frac{n_L^2 n_H^2}{n_0^2(n_L^2 + n_H^2)}$$

and $$\sin^2\theta_2 = \frac{n_M^2 n_H^2}{n_0^2(n_M^2 + n_H^2)}$$

where $n_H$ indicates the refractive index of said high refractive index layer, $n_M$ indicates the refractive index of said intermediate refractive index, $n_L$ indicates the refractive index of said low refractive index layer, and $n_0$ indicates the refractive indices of said first and second prisms.

17. A polarization beam splitter comprising a first prism, a second prism, and a transparent parallel flat plate having two dielectric multilayer films formed on each surface thereof, said transparent parallel flat plate is sandwiched between said first and second prisms, at least one of said dielectric multilayer films comprising: first alternating layers of a high refractive index layer having a refractive index higher than refractive indices of said first and second prisms and an intermediate refractive index layer having a refractive index lower than the refractive index of said high refractive index layer; and second alternating layers of said high refractive index and a low refractive index layer having a refractive index lower than the refractive index of said intermediate refractive index layer, a reference incident angle $\theta_0$ of light which is incident on said dielectric multilayer film through said first or second prism being within a range indicated in the following expression:

$$\theta_1 < \theta_0 < \theta_2$$

where $$\sin^2\theta_1 = \frac{n_L^2 n_H^2}{n_0^2(n_L^2 + n_H^2)}$$

and $$\sin^2\theta_2 = \frac{n_M^2 n_H^2}{n_0^2(n_M^2 + n_H^2)}$$

where $n_H$ indicates the refractive index of said high refractive index layer, $n_M$ indicates the refractive index of said intermediate refractive index layer, $n_L$ indicates the refractive index of said low refractive index layer, and $n_0$ indicates the refractive indices of said first and second prisms.

18. A polarization beam splitter according to claim 17, wherein said first and second prisms are made of a glass material.

19. A polarization beam splitter according to claim 17, wherein said first and second prisms are made of a transparent filling material which fills a transparent container having said transparent parallel flat substrate.

20. A polarization beam splitter according to claim 19, wherein said transparent filling material contains at least one of ethylene glycol, diethylene glycol, and propylene glycol.

21. A polarization beam splitter according to claim 19, wherein said transparent filling material is a silicone resin which is cured in said container.

22. A polarization beam splitter according to claim 17, wherein said at least one dielectric multilayer film consists of at least 13 dielectric layers.

23. A polarization beam splitter according to claim 17, wherein, in said at least one dielectric multilayer film, even-numbered layers counted from a side of said first or second prism are said high refractive index layers.

24. A polarization beam splitter according to claim 17, wherein, in said at least one dielectric multilayer film, layers which are respectively nearest to said first and second prisms have an optical thickness which is ⅛ of a predetermined main wavelength of design, and the other layers have an optical thickness which is ¼ of the main wavelength of design.

25. A projection display apparatus comprising: a light source; a pre-polarizer which selectively allows substantially linearly polarized light of light emitted from said light source, to pass through said pre-polarizer; a polarization beam splitter which reflects said linearly polarized light which has passed through said pre-polarizer; a reflection-type light valve which modulates a polarization state of light reflected by said polarization beam splitter, thereby forming an optical image; and a projection lens which projects said optical image formed by said light valve, onto a screen, wherein said polarization beam splitter comprising a first prism, a second prism, and a transparent parallel flat plate having two dielectric multilayer films formed on each surface thereof, said transparent parallel flat plate is sandwiched between said first and second prisms, at least one of said dielectric multilayer films comprising: first alternating layers of a high refractive index layer having a refractive index higher than refractive indices of said first and second prisms and an intermediate refractive index layer having a refractive index lower than the refractive index of said high refractive index layer; and second alternating layers of said high refractive index layer and a low refractive index layer having a refractive index lower than the refractive index of said intermediate refractive index layer, a reference incident angle $\theta_0$ of light which is incident on said dielectric multilayer film through said first or second prism being within a range indicated in the following expression:

$$\theta_1 < \theta_0 < \theta_2$$

where $$\sin^2\theta_1 = \frac{n_L^2 n_H^2}{n_0^2(n_L^2 + n_H^2)}$$

and $$\sin^2\theta_2 = \frac{n_M^2 n_H^2}{n_0^2(n_M^2 + n_H^2)}$$

where $n_H$ indicates the refractive index of said high refractive index layer, $n_M$ indicates the refractive index of said intermediate refractive index layer, $n_L$ indicates the refractive index of said low refractive index layer, and $n_0$ indicates the refractive indices of said first and second prisms, and said polarization beam splitter changes a propagation direction of said linearly polarized light which has passed through said pre-polarizer, to direct said linearly polarized light to said light valve, selectively transmits light which has the polarization state modulated by said light valve, and which has been reflected by said light valve, and directs said selectively transmitted linearly polarized light to said projection lens.

26. A projection display apparatus comprising: a light source which radiates light including three primary color components; a pre-polarizer which selectively allows substantially linearly polarized light of light radiated from said light source, to pass through said pre-polarizer; color separation means for separating light output from said pre-polarization beam splitter into three primary color light beams; three polarization beam splitters which function as polarizers and analyzers, and which respectively correspond to said three primary color light beams; three reflection light valves which respectively modulate polarization states of light beams entering from said three polarization beam splitters, thereby forming optical images; and three projection lenses which respectively project said optical images formed by said three light valves, onto a screen, each of said three polarization beam splitters comprising a first prism, a second prism, and a transparent parallel flat plate having two dielectric multilayer films formed on each surface thereof, said transparent parallel flat plate is sandwiched between said first and second prisms, at least one of said dielectric multilayer films comprising: first alternating layers of a high refractive index layer having a refractive index higher than refractive indices of said first and second prisms and an intermediate refractive index layer having a refractive index lower than the refractive index of said high refractive index layer; and second alternating layers of said high refractive index layer and a low refractive index layer having a refractive index lower than the refractive index of said intermediate refractive index layer, a reference incident angle $\theta_0$ of light which is incident on said dielectric multilayer film through said first or second prism being within a range indicated in the following expression:

$$\theta_1 < \theta_0 < \theta_2$$

where $$\sin^2\theta_1 = \frac{n_L^2 n_H^2}{n_0^2(n_L^2 + n_H^2)}$$

and $$\sin^2\theta_2 = \frac{n_M^2 n_H^2}{n_0^2(n_M^2 + n_H^2)}$$

where $n_H$ indicates the refractive index of said high refractive index layer, $n_M$ indicates the refractive index of said intermediate refractive index layer, $n_L$ indicates the refractive index of said low refractive index layer, and $n_0$ indicates the refractive indices of said first and second prisms.

\* \* \* \* \*

UNITED STATES PATENT AND TRADEMARK OFFICE
CERTIFICATE OF CORRECTION

PATENT NO. : 5,453,859
DATED : September 26, 1995
INVENTOR(S) : Sannohe et al

It is certified that error appears in the above-identified patent and that said Letters Patent is hereby corrected as shown below:

Column 3, line 43, equation 3, change "$n_G^2$" to --$n_0^2$--.

Column 3, line 48, equation 4, change "$n_G^2$" to --$n_0^2$--.

IN THE CLAIMS:

Claim 9, column 17, line 40, insert --$<$-- between "$\theta_0$" and "$\theta_2$".

Signed and Sealed this

Thirteenth Day of February, 1996

Attest:

BRUCE LEHMAN

*Attesting Officer*   Commissioner of Patents and Trademarks